United States Patent
Manolakos et al.

(10) Patent No.: US 10,425,935 B2
(45) Date of Patent: Sep. 24, 2019

(54) CONFIGURING A NOMINAL NUMBER OF RESOURCE ELEMENTS IN A DATA CHANNEL

(71) Applicant: QUALCOMM Incorporated, San Diego, CA (US)

(72) Inventors: Alexandros Manolakos, San Diego, CA (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/940,596

(22) Filed: Mar. 29, 2018

(65) Prior Publication Data

US 2018/0324767 A1 Nov. 8, 2018

(30) Foreign Application Priority Data

May 2, 2017 (GR) .............................. 20170100198

(51) Int. Cl.
*H04W 72/04* (2009.01)
*H04L 5/00* (2006.01)
*H04W 72/08* (2009.01)

(52) U.S. Cl.
CPC ......... *H04W 72/042* (2013.01); *H04L 5/0042* (2013.01); *H04L 5/0044* (2013.01); *H04L 5/0053* (2013.01); *H04L 5/0094* (2013.01); *H04W 72/0413* (2013.01); *H04W 72/08* (2013.01)

(58) Field of Classification Search
None
See application file for complete search history.

(56) References Cited

U.S. PATENT DOCUMENTS

| | | | |
|---|---|---|---|
| 2011/0059764 A1* | 3/2011 | Dai | H04L 1/0026 455/522 |
| 2014/0185479 A1 | 7/2014 | Lee | |
| 2014/0301287 A1* | 10/2014 | Frenne | H04L 5/0048 370/329 |
| 2014/0313985 A1* | 10/2014 | Nimbalker | H04L 27/0012 370/329 |

(Continued)

OTHER PUBLICATIONS

International Search Report and Written Opinion—PCT/US2018/025542—ISA/EPO—dated Jun. 28, 2018.

*Primary Examiner* — Kodzovi Acolatse
(74) *Attorney, Agent, or Firm* — Holland & Hart LLP

(57) ABSTRACT

Methods, systems, and devices for wireless communication are described. A base station may transmit a set of candidate resource element parameters to a wireless device. Each candidate resource element parameters may indicate a nominal number of physical resource block resource elements. The base station may then transmit downlink control information and a data transmission during a slot. The data transmission may include one or more transport blocks whose size is based on a nominal number of physical resource block resource elements. The wireless device may select one of the candidate resource element parameters from the set of candidate resource element parameters based at least in part on the downlink data, determine a transport block size for the data transmission, and decode the data transmission.

30 Claims, 15 Drawing Sheets

(56) References Cited

U.S. PATENT DOCUMENTS

| | | | |
|---|---|---|---|
| 2016/0198442 A1 | 7/2016 | Suzuki et al. | |
| 2017/0078830 A1* | 3/2017 | Wu | H04W 4/70 |
| 2017/0290008 A1* | 10/2017 | Tooher | H04L 1/0007 |
| 2018/0014320 A1* | 1/2018 | Xu | H04W 72/04 |
| 2018/0054821 A1* | 2/2018 | Sun | H04W 16/14 |
| 2018/0092080 A1* | 3/2018 | Kim | H04W 72/044 |
| 2018/0192420 A1* | 7/2018 | Hao | H04W 72/0446 |

* cited by examiner

CONFIGURING A NOMINAL NUMBER OF RESOURCE ELEMENTS IN A DATA CHANNEL

CROSS REFERENCES

The present Application for Patent claims priority to Greek Provisional Patent Application No. 20170100198 by Manolakos, et al., entitled "Configurability Considerations of the Nominal Number of Resource Elements in Data Channel for NR," filed May 2, 2017, assigned to the assignee hereof.

BACKGROUND

The following relates generally to wireless communication, and more specifically to configuring a nominal number of resource elements in a data channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Each data transmission in a LTE system may include one or more transport blocks. The size of the transport blocks may vary. In LTE systems, a UE determines the size of a transport block for a data transmission based upon the allocation of resources and the modulation and coding scheme (MCS) used for the data transmission. In particular, a UE stores a table showing the transport block size based on the number of physical resource blocks assigned to the UE ($N_{PRB}$) and the modulation and coding scheme used for the data transmission.

SUMMARY

The described techniques relate to improved methods, systems, devices, or apparatuses that support configuring a nominal number of resource elements in a data channel.

A method of wireless communication is described. The method may include receiving, by a wireless device, a set of candidate resource element parameters, each candidate resource element parameter indicating a nominal number of physical resource block resource elements, receiving downlink control information during a slot, receiving a data transmission during the slot, selecting one of the candidate resource element parameters based at least in part on the downlink control information, and processing the data transmission based at least in part on the nominal number of physical resource block resource elements indicated by the selected candidate resource element parameter.

An apparatus for wireless communication is described. The apparatus may include means for receiving, by a wireless device, a set of candidate resource element parameters, each candidate resource element parameter indicating a nominal number of physical resource block resource elements, means for receiving downlink control information during a slot, means for receiving a data transmission during the slot, means for selecting one of the candidate resource element parameters based at least in part on the downlink control information, and means for processing the data transmission based at least in part on the nominal number of physical resource block resource elements indicated by the selected candidate resource element parameter.

Another apparatus for wireless communication is described. The apparatus may include a processor, memory in electronic communication with the processor, and instructions stored in the memory. The instructions may be operable to cause the processor to receive, by a wireless device, a set of candidate resource element parameters, each candidate resource element parameter indicating a nominal number of physical resource block resource elements, receive downlink control information during a slot, receive a data transmission during the slot, select one of the candidate resource element parameters based at least in part on the downlink control information, and process the data transmission based at least in part on the nominal number of physical resource block resource elements indicated by the selected candidate resource element parameter.

A non-transitory computer readable medium for wireless communication is described. The non-transitory computer-readable medium may include instructions operable to cause a processor to receive, by a wireless device, a set of candidate resource element parameters, each candidate resource element parameter indicating a nominal number of physical resource block resource elements, receive downlink control information during a slot, receive a data transmission during the slot, select one of the candidate resource element parameters based at least in part on the downlink control information, and process the data transmission based at least in part on the nominal number of physical resource block resource elements indicated by the selected candidate resource element parameter.

In some examples of the method, apparatus, and non-transitory computer-readable medium described above, processing the data transmission comprises: determining a transport block size for the data transmission based at least in part on the selected nominal number of physical resource block resource elements.

In some examples of the method, apparatus, and non-transitory computer-readable medium described above, processing the data transmission comprises: computing channel state information for the physical downlink channel based at least in part on the selected number of nominal resource elements.

Some examples of the method, apparatus, and non-transitory computer-readable medium described above may further include processes, features, means, or instructions for transmitting the channel state information to a base station.

Some examples of the method, apparatus, and non-transitory computer-readable medium described above may further include processes, features, means, or instructions for computing additional channel state information for the physical downlink channel based at least in part on a second candidate resource element parameter, wherein the second candidate resource element parameter may be adjacent to the first second candidate resource element parameter in the set of candidate resource element parameters.

Some examples of the method, apparatus, and non-transitory computer-readable medium described above may further include processes, features, means, or instructions for transmitting the additional channel state information to the base station.

Some examples of the method, apparatus, and non-transitory computer-readable medium described above may further include processes, features, means, or instructions for receiving an indication of how the candidate resource element parameter may be to be selected for the slot.

In some examples of the method, apparatus, and non-transitory computer-readable medium described above, the downlink control information comprises an explicit indication of the nominal number of physical resource block resource elements, and wherein the candidate resource element parameter may be selected based at least in part on the explicit indication.

In some examples of the method, apparatus, and non-transitory computer-readable medium described above, the explicit indication of the nominal number of physical resource block resource elements may be included in a device-specific control search space.

In some examples of the method, apparatus, and non-transitory computer-readable medium described above, selecting the candidate resource element parameter based at least in part on the downlink control information comprises: selecting the number of nominal resource elements based at least in part on a configuration of the downlink control information.

In some examples of the method, apparatus, and non-transitory computer-readable medium described above, selecting the candidate resource element parameter based at least in part on the configuration of the downlink control information comprises: using a selection algorithm known to the UE and a base station to select the candidate resource element parameter.

Some examples of the method, apparatus, and non-transitory computer-readable medium described above may further include processes, features, means, or instructions for receiving the selection algorithm from the base station.

In some examples of the method, apparatus, and non-transitory computer-readable medium described above, the selection algorithm comprises at least one of an algorithm for selecting the candidate resource element parameter corresponding to a slot configuration of the downlink control information, an algorithm for selecting the candidate resource element parameter corresponding to reference signal overhead of the downlink control information, and an algorithm for selecting the candidate resource element parameter corresponding to a number of physical downlink shared channel (PDSCH) symbols in the downlink control information.

In some examples of the method, apparatus, and non-transitory computer-readable medium described above, the selection algorithm comprises an algorithm for selecting the candidate resource element parameter closest to a number of resources that may be available in the slot.

Some examples of the method, apparatus, and non-transitory computer-readable medium described above may further include processes, features, means, or instructions for receiving, from a transmitting base station, an indication of whether aperiodic channel state information reference signals may be to be taken into account when selecting the number of nominal resource elements.

Some examples of the method, apparatus, and non-transitory computer-readable medium described above may further include processes, features, means, or instructions for receiving, from a transmitting base station, an indication of which reference signals may be to be taken into account when selecting the number of nominal resource elements.

In some examples of the method, apparatus, and non-transitory computer-readable medium described above, the candidate resource element parameter may be selected based at least in part on a slot identifier in the downlink control information, reference signal overhead in the downlink control information, and a number of symbols containing a data channel configuration in the downlink control information.

In some examples of the method, apparatus, and non-transitory computer-readable medium described above, the channel state information comprises a channel quality indicator.

In some examples of the method, apparatus, and non-transitory computer-readable medium described above, the set of candidate resource element parameters may be received in a radio resource control message.

In some examples of the method, apparatus, and non-transitory computer-readable medium described above, the set of candidate resource element parameters may be received in a medium access control (MAC) control element (CE) message.

A method of wireless communication is described. The method may include receiving, by a wireless device, a set of candidate resource element parameters, each candidate resource element parameter indicating a nominal number of physical resource block resource elements, receiving downlink control information during a slot, selecting one of the candidate resource element parameters based at least in part on the downlink control information, and configuring uplink control information and an uplink data transmission based at least in part on the selected candidate resource element parameter.

An apparatus for wireless communication is described. The apparatus may include means for receiving, by a wireless device, a set of candidate resource element parameters, each candidate resource element parameter indicating a nominal number of physical resource block resource elements, means for receiving downlink control information during a slot, means for selecting one of the candidate resource element parameters based at least in part on the downlink control information, and means for configuring uplink control information and an uplink data transmission based at least in part on the selected candidate resource element parameter.

Another apparatus for wireless communication is described. The apparatus may include a processor, memory in electronic communication with the processor, and instructions stored in the memory. The instructions may be operable to cause the processor to receive, by a wireless device, a set of candidate resource element parameters, each candidate resource element parameter indicating a nominal number of physical resource block resource elements, receive downlink control information during a slot, select one of the candidate resource element parameters based at least in part on the downlink control information, and configure uplink control information and an uplink data transmission based at least in part on the selected candidate resource element parameter.

A non-transitory computer readable medium for wireless communication is described. The non-transitory computer-readable medium may include instructions operable to cause a processor to receive, by a wireless device, a set of candidate resource element parameters, each candidate resource element parameter indicating a nominal number of physical resource block resource elements, receive downlink control information during a slot, select one of the candidate resource element parameters based at least in part on the downlink control information, and configure uplink control information and an uplink data transmission based at least in part on the selected candidate resource element parameter.

A method of wireless communication is described. The method may include transmitting, by a base station, a set of candidate resource element parameters, each candidate resource element parameter indicating a nominal number of physical resource block resource elements, generating downlink control information and a transport block based at least in part on one of the candidate resource element parameters chosen from the set of candidate resource element parameters, transmitting a first transmission comprising the downlink control information and the transport block to a wireless device, receiving, from the wireless device, a negative acknowledgement indicating that the wireless device was unable to decode at least one of the downlink control information and the transport block, and transmitting a second transmission comprising the transport block to the receiving device, wherein the base station transmits the second transmission to the receiving device such that the wireless device has sufficient information to select the chosen one of the candidate resource element parameters from the set of candidate resource element parameters.

An apparatus for wireless communication is described. The apparatus may include means for transmitting, by a base station, a set of candidate resource element parameters, each candidate resource element parameter indicating a nominal number of physical resource block resource elements, means for generating downlink control information and a transport block based at least in part on one of the candidate resource element parameters chosen from the set of candidate resource element parameters, means for transmitting a first transmission comprising the downlink control information and the transport block to a wireless device, means for receiving, from the wireless device, a negative acknowledgement indicating that the wireless device was unable to decode at least one of the downlink control information and the transport block, and means for transmitting a second transmission comprising the transport block to the receiving device, wherein the base station transmits the second transmission to the receiving device such that the wireless device has sufficient information to select the chosen one of the candidate resource element parameters from the set of candidate resource element parameters.

Another apparatus for wireless communication is described. The apparatus may include a processor, memory in electronic communication with the processor, and instructions stored in the memory. The instructions may be operable to cause the processor to transmit, by a base station, a set of candidate resource element parameters, each candidate resource element parameter indicating a nominal number of physical resource block resource elements, generate downlink control information and a transport block based at least in part on one of the candidate resource element parameters chosen from the set of candidate resource element parameters, transmit a first transmission comprising the downlink control information and the transport block to a wireless device, receive, from the wireless device, a negative acknowledgement indicating that the wireless device was unable to decode at least one of the downlink control information and the transport block, and transmit a second transmission comprising the transport block to the receiving device, wherein the base station transmits the second transmission to the receiving device such that the wireless device has sufficient information to select the chosen one of the candidate resource element parameters from the set of candidate resource element parameters.

A non-transitory computer readable medium for wireless communication is described. The non-transitory computer-readable medium may include instructions operable to cause a processor to transmit, by a base station, a set of candidate resource element parameters, each candidate resource element parameter indicating a nominal number of physical resource block resource elements, generate downlink control information and a transport block based at least in part on one of the candidate resource element parameters chosen from the set of candidate resource element parameters, transmit a first transmission comprising the downlink control information and the transport block to a wireless device, receive, from the wireless device, a negative acknowledgement indicating that the wireless device was unable to decode at least one of the downlink control information and the transport block, and transmit a second transmission comprising the transport block to the receiving device, wherein the base station transmits the second transmission to the receiving device such that the wireless device has sufficient information to select the chosen one of the candidate resource element parameters from the set of candidate resource element parameters.

In some examples of the method, apparatus, and non-transitory computer-readable medium described above, the second transmission comprises an explicit indication of the chosen one of the candidate resource element parameters.

In some examples of the method, apparatus, and non-transitory computer-readable medium described above, the set of candidate resource element parameters includes only a single entry.

In some examples of the method, apparatus, and non-transitory computer-readable medium described above, the second transmission comprises the downlink control information.

In some examples of the method, apparatus, and non-transitory computer-readable medium described above, the downlink control information may have a same slot configuration and a same reference signal overhead in the first transmission and the second transmission.

DETAILED DESCRIPTION

The use of a table for determining transport block size may be impractical when a large number of combinations of modulation and coding schemes (MCS) and allocations of resources may be used by the base station. Such concerns may be particularly acute in the context of new radio (NR) networks. Instead of using a table, the transport block size may be calculated based at least in part on a nominal number of resource elements per resource block. However, the wireless device may not know the nominal number of resource blocks used by the base station in calculating the transport size block. In the absence of such information, the wireless device may not be able to decode the transport block.

Accordingly, the base station may transmit a set of candidate resource element parameters, where each candidate resource element parameter indicates a nominal number of physical resource block resource elements that the base station may utilize to calculate the transport block size for a given data transmission. The base station may then select a nominal number of physical resource block resource elements based on the set of candidate resource element parameters and calculate the transport block size based at least in part on the selected nominal number of physical resource block resource elements. The base station may transmit the transport block(s) along with downlink control information to the wireless device. The wireless device may select one of the candidate resource element parameters based at least in part on the downlink control information. The wireless device may then calculate the transport block size based upon the selected candidate resource element parameter, and decode the data transmission.

Figure 1:
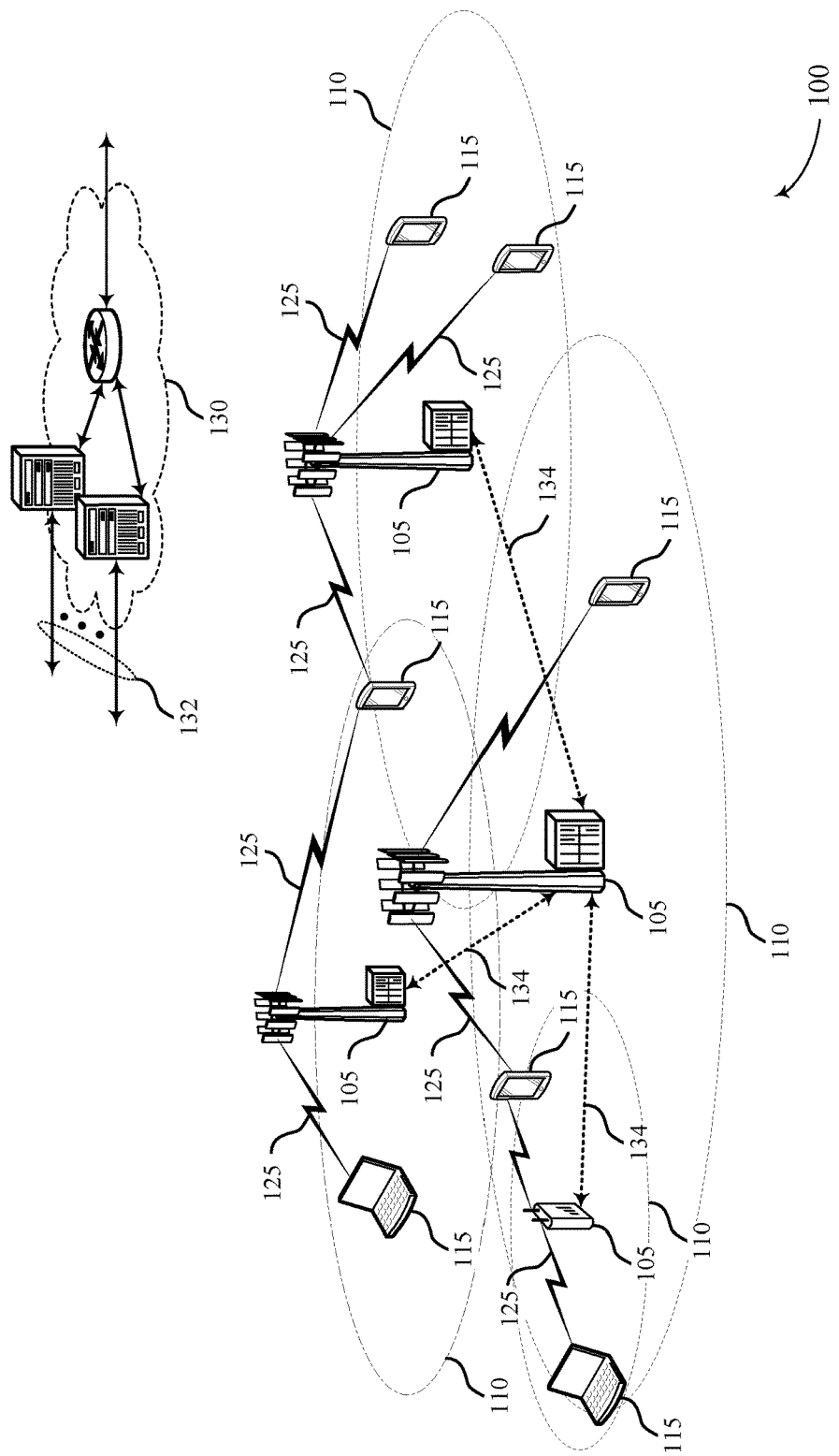
FIG. 1 illustrates an example of a system for wireless communication that supports configuring a nominal number of resource elements in a data channel in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of the network devices, such as a base station 105, may include a communications manager 101 which may generate a set of UE-specific candidate resource element parameters for transmission to a particular UE. In some examples, the set of UE-specific candidate resource element parameters may include one or more nominal numbers of physical resource block resource elements that the base station 105 may use for data transmissions to the UE. The communications manager 101 may further select a nominal number of physical resource block resource elements from the set of candidate resource element parameters and generate one or more transport blocks based at least in part on the selected nominal number of physical resource block resource elements. The communications manager 101 may generate downlink control information (DCI) based at least in part on the selected nominal number of physical resource block resource elements. In some examples, the communications manager 101 may determine whether to include an explicit indication of the selected nominal number of physical resource block resource elements in the DCI. The communications manager 101 may generate a second transmission including a transport block upon receiving a negative acknowledgement indicating that a UE was unable to decode the transport block in a first transmission (e.g., because the UE was unable to decode the accompanying DCI). The second transmission may include information sufficient to allow the UE receiving the second transmission to determine the nominal number of physical resource block resource elements used to determine the size of the transport block. For example, the communications manager 101 may include an explicit indication of the selected nominal number of physical resource block resource elements in the second transmission. As another example, the communications manager 101 may include the DCI from the first transmission, in the same configuration, in the second transmission.

UEs 115 may include a communications manager 102, which may determine, based at least in part on DCI, which nominal number of physical resource block resource elements from a set of nominal number of physical resource block resource elements was used to configure the DCI and/or accompanying transport blocks. In some examples, the communications manager 102 may determine the nominal number of physical resource block resource elements based at least in part on a configuration of the DCI. The communications manager 102 may determine a transport block size based at least in part on the determined nominal number of physical resource block resource elements. In some examples, the communications manager 102 may determine channel state information (e.g., a channel state indicator) based at least in part on the determined nominal number of physical resource block resource elements. The communications manager 102 may generate an uplink transmission (e.g., an uplink data transmission and/or uplink control information) based at least in part on the determined nominal number of physical resource block resource elements.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
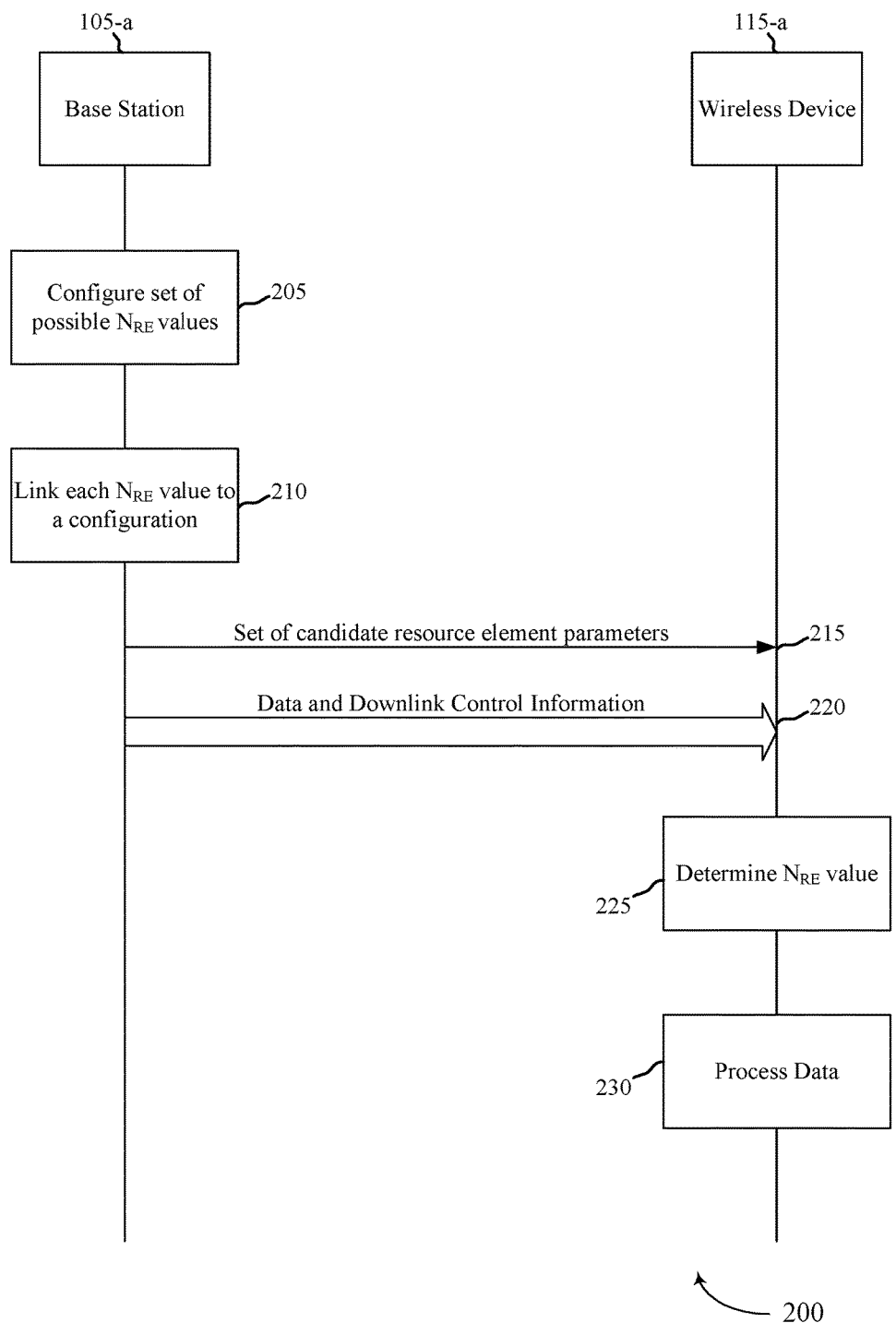
FIG. 2 illustrates an example of a communication flow that supports configuring a nominal number of resource elements in a data channel in accordance with aspects of the present disclosure.

FIG. 2 illustrates an example of a communication flow 200 that supports configuring a nominal number of resource elements in a data channel in accordance with various aspects of the present disclosure. In some examples, communication flow 200 may implement aspects of wireless communications system 100.

FIG. 2 shows a communication flow 200 between a base station 105-*a* and a wireless device 115-*a*. Base station 105-*a* may be an example of aspects of a base station 105 as described with reference to FIG. 1. Wireless device 115-*a* may be an example of aspects of a UE 115 as described with reference to FIG. 1.

The base station 105-*a* may configure a set of possible numbers of nominal resource elements at 205. The number of nominal resource elements per physical resource block (PRB) may be denoted as $N_{RE}^{DL,PRB}$ which will also be referred to as an $N_{RE}$ value. The set of possible $N_{RE}$ values may be specific to a particular device such as wireless device 115-*a*. In some examples, the base station 105-*a* may semi-statically configure the set of $N_{RE}$ values.

The $N_{RE}$ values may correspond to nominally available resources for a physical downlink shared channel (PDSCH) in each physical resource block (PRB). For example, a $N_{RE}$ value of 48 may correspond to the available resources assigned to a PDSCH channel for a 14-symbol slot with a two symbol downlink (DL) control, a two symbol demodulation reference signal (DMRS), a two symbol channel state information reference signal (CSIRS), and a two symbol uplink common burst. As another example, a $N_{RE}$ value of 72 may correspond to the available resources assigned to a PDSCH channel for a 14-symbol slot with a two symbol DL control, a two symbol DMRS, and a two symbol CSIRS. As yet another example, a $N_{RE}$ value of 96 may correspond to the available resources assigned to a PDSCH channel for a 14-symbol slot with a two symbol DL control, a one symbol DMRS, and a one symbol CSIRS.

In some examples, the base station 105-*a* may determine that communications with the wireless device 115-*b* have a high risk of failure. For example, the base station 105-*a* may determine that the channel quality between the base station 105-*a* and the wireless device 115-*a* is poor, or that the wireless device 115-*a* is located at a cell edge. Based on such a determination, the base station 105-*a* may configure only a single $N_{RE}$ value for communications between the base station 105-*a* and the wireless device 115-*a*.

Each $N_{RE}$ value may be linked to at least one possible configuration of available resources at 210. For example, each $N_{RE}$ value may be linked to a reference signal overhead configuration or a number of symbols containing data channel configuration information. In some examples, each $N_{RE}$ value may be linked to at least one possible configuration of reference signals such as CSIRS and/or DRMS. The configuration may be determined based at least in part on an algorithm known to the base station 105-*a* and the wireless device 115-*a*. When transmitting data to the wireless device 115-*a*, the base station 105-*a* may use the configuration corresponding to the chosen $N_{RE}$ value for the downlink control information.

A set of candidate resource element parameters may be transmitted to the wireless device 115-*a* at 215. The set of candidate resource element parameters may include, for example, the set of possible $N_{RE}$ values for the wireless device 115-*a*. In other examples, the set of candidate resource element parameters may include an indication of the possible $N_{RE}$ values, e.g., using symbols whose corresponding $N_{RE}$ values are known to both the base station 105-*a* and the wireless device 115-*a*. In some examples, the set of candidate resource element parameters may be transmitted in a radio resource control (RRC) message. In some other examples, the set of candidate resource element parameters may be transmitted in a medium access control (MAC) control element (CE) message.

The base station 105-*a* may transmit data and downlink control information to the wireless device 115-*a* at 220. The data and downlink control information may be transmitted during the same time period (e.g., a particular slot, mini-slot, or subframe, although any scheduling unit may be used for this purpose) but on different channels (e.g., in different frequency bands).

In some examples, the downlink control information may include an explicit indication of the $N_{RE}$ value used for the data transmission. The explicit indication of the $N_{RE}$ value may be included in a device-specific control search space. In some examples, the downlink control information may include DMRS configuration for the current slot, CSIRS configuration for the current slot, and similar information related to other signals present in the slot which occupy resources in the slot that cannot be used for the PDSCH channel (e.g., interference measurement resources (IMR)).

The base station 105-*a* may determine whether to include an explicit indication of the $N_{RE}$ value based on the channel quality and/or the location of the wireless device 115-*a*. For example, the base station 105-*a* may determine to include an explicit indication of the $N_{RE}$ value when the wireless device 115-*a* is located at a cell edge, or when physical downlink control channel (PDCCH) is poor, because the risk of channel failure is high. The base station 105-*a* may determine not to include the explicit indication of the $N_{RE}$ value when the wireless device 115-*a* is not located at a cell edge and the channel quality is acceptable in order to minimize overhead.

The wireless device 115-*a* may determine which $N_{RE}$ value from the set of possible $N_{RE}$ values was used for the data transmission based at least in part on the downlink control information at 225. In some examples, the wireless device 115-*a* may determine that the $N_{RE}$ value used for the data transmission was the $N_{RE}$ value that matches the explicit indication of the $N_{RE}$ value in the downlink control information. In some examples, the wireless device 115-*a* may determine the $N_{RE}$ value based at least in part on the configuration (e.g., the format) of the downlink control information. For example, the $N_{RE}$ value may be determined based at least in part on a slot configuration of the downlink control information, reference signal overhead of the downlink control information, or a number of symbols containing the data channel configuration in the downlink control information.

In some examples, the wireless device 115-*a* may select the $N_{RE}$ value based at least in part on an algorithm known to both the base station 105-*a* and the wireless device 115-*a*. The algorithm may be transmitted from the base station 105-*a* to the wireless device 115-*a* (e.g., along with the set of candidate resource elements or at another time). In some examples, the wireless device 115-*a* may select the $N_{RE}$ value based on the algorithm by selecting the $N_{RE}$ value corresponding to the slot configuration of the downlink control information, selecting the $N_{RE}$ value corresponding to the reference signal overhead of the downlink control information, or selecting the $N_{RE}$ value corresponding to the number of PDSCH symbols in the downlink control information. In other examples, the wireless device 115-*a* may select the $N_{RE}$ value based on the algorithm by selecting the $N_{RE}$ value closest to the number of resources that are available for data transmission in the downlink control information of the slot. For example, the wireless device 115-*a* may subtract the DMRS, CSIRS, and control symbols from the available resources and, based on the result, select the closest $N_{RE}$ value from the set of possible $N_{RE}$ values.

In some examples, the base station 105-*a* may indicate whether aperiodic CSIRS should be taken into account when determining the $N_{RE}$ value. For example, the wireless device 115-*a* may not take the aperiodic CSIRS into account in determining the $N_{RE}$ value when an indication that the aperiodic CSIRS should not be taken into account is received from the base station 105-*a*.

In some examples, the base station 105-*a* may transmit an algorithm to the wireless device 115-*a*. The wireless device 115-*a* may utilize the received algorithm to select the $N_{RE}$ value based at least in part on the configuration of the downlink control information. Transmission of the algorithm may increase the amount of signaling overhead.

The wireless device 115-*a* may then process the data based at least in part on the determined $N_{RE}$ value at 230. In some examples, the wireless device 115-*a* may calculate a transport block size based at least in part on the determined $N_{RE}$ value. For example, the transport block size (TBS) in bits may be calculated as:

$$TBS = 8 \times \left\lceil \frac{N_{PRB} \times N_{RE} \times v \times Q_m \times R}{8} \right\rceil$$

where $N_{PRB}$ is the number of physical resource blocks assigned to the wireless device 115-*a*, v is the number of layers the codeword is mapped onto after the transport block is encoded into the codeword, $Q_m$ is the number of bits carried by each modulated symbol (e.g., 2 for QPSK, 14 for 16-QAM, 4 for 64-QAM, 8 for 256-QAM, 10 for 1024-QAM), and R is the coding rate associated with the chosen modulation and coding scheme (MCS). In some examples, the ceiling operation in the above equation may be a floor operation or a round operation. The division by 8 inside the ceiling operation may be included to ensure that the TBS is a multiple of 8-bits (one byte). In some examples, the division by 8 operation may be omitted.

The data may then be interpreted based on the calculated TBS.

Additionally or alternatively, processing the data may include calculating channel state information (CSI). For example, the wireless device 115-*a* may calculate a channel quality indicator (CQI) based at least in part on the determined $N_{RE}$ value.

In some examples, the base station 105-*a* may request that the wireless device 115-*a* calculate CSI for more than one of the possible $N_{RE}$ values. The wireless device 115-*a* may calculate CSI for the determined $N_{RE}$ value as well as one or more additional CSI values for other possible $N_{RE}$ values. For example, the wireless device 115-*a* may select a next smallest $N_{RE}$ value and a next largest $N_{RE}$ value from the set of possible $N_{RE}$ values and calculate additional CQIs based on these additional $N_{RE}$ values.

The wireless device 115-*a* may transmit the CSI for the determined $N_{RE}$ value and, where applicable, CSI values for additional $N_{RE}$ values to the base station 105-*a*.

Figure 3:
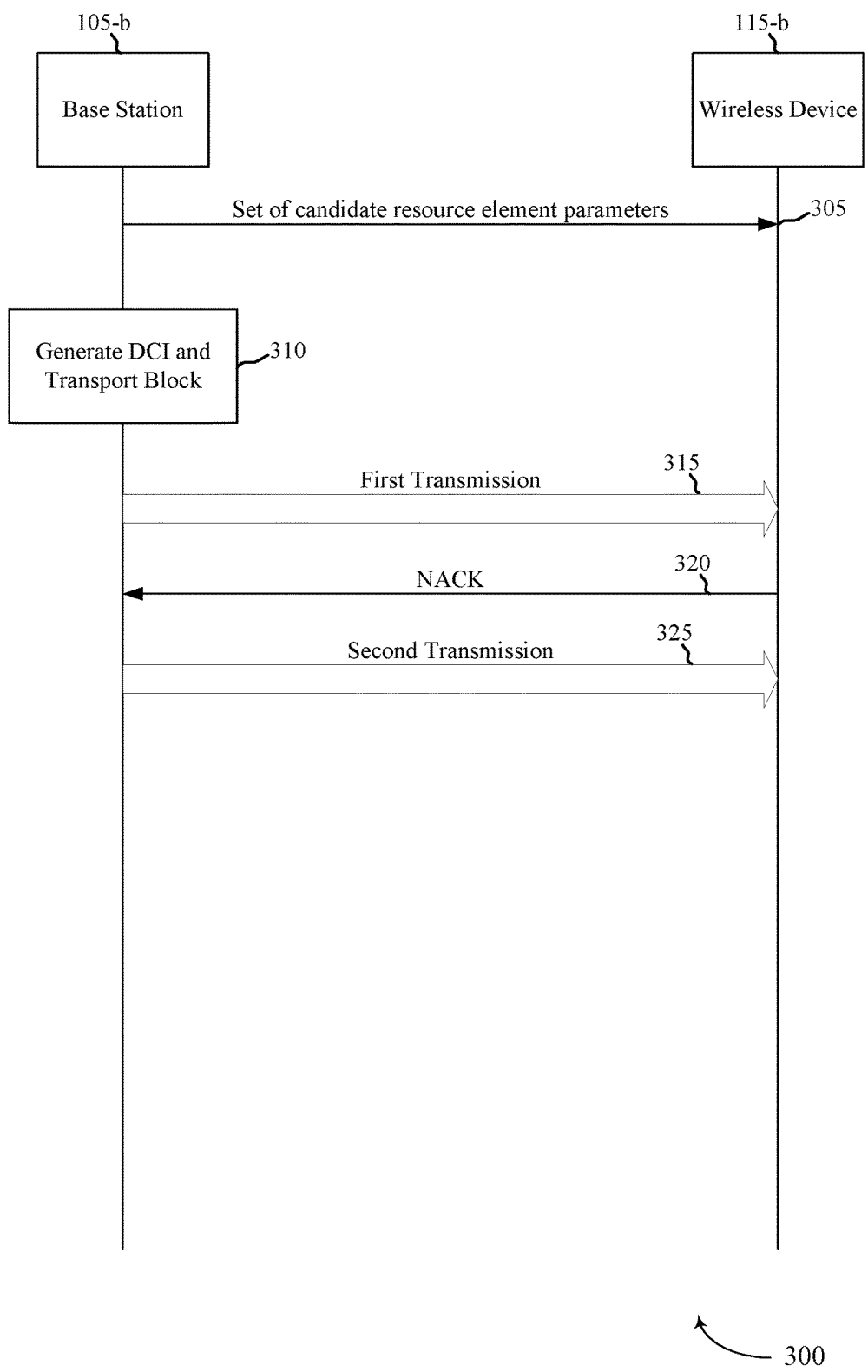
FIG. 3 illustrates an example of a communication flow that supports configuring a nominal number of resource elements in a data channel in accordance with aspects of the present disclosure.

FIG. 3 illustrates an example of a communication flow 300 that supports configuring a nominal number of resource elements in a data channel in accordance with various aspects of the present disclosure. In some examples, communication flow 300 may implement aspects of wireless communications system 100.

FIG. 3 shows a communications flow 300 between a base station 105-*b* and a wireless device 115-*b*. Base station 105-*b* may be an example of aspects of a base station 105 as described with reference to FIG. 1. Wireless device 115-*b* may be an example of aspects of a UE 115 as described with reference to FIG. 1.

The base station 105-*b* may transmit a set of candidate resource element parameters 305 to the wireless device 115-*b*. The set of candidate resource element parameters 305 may be an example of aspects of the set of candidate resource element parameters 215 described with reference to FIG. 2. In some examples, the set of candidate resource element parameters 305 may be a set of $N_{RE}$ values.

The base station 105-*b* may choose a $N_{RE}$ value from the set of candidate resource element parameters 305. The base station 105-*b* may generate downlink control information and a transport block based at least in part on the chosen $N_{RE}$ value at 310. In some examples, the size of the transport block may be determined based at least in part on the chosen $N_{RE}$ value. In some examples, the configuration of the downlink control information may be determined based at least in part on the chosen $N_{RE}$ value. For example, the wireless device 115-*b* may determine the slot configuration of the downlink control information, the reference signal overhead of the downlink control information, and/or the number of PDSCH symbols in the downlink control information based at least in part on the chosen $N_{RE}$ value.

The base station 105-*b* may transmit a first transmission 315 to the wireless device 115-*b*. The first transmission 315 may include the downlink control information and the transport block that were generated based at least in part on the chosen $N_{RE}$ value. For example, the first transmission 315 may be an example of aspects of data and downlink control information 220 described with reference to FIG. 2.

The wireless device 115-*b* may be unable to process the data in the transport block, for example, because the wireless device 115-*b* cannot decode the downlink control information in the first transmission 315. Accordingly, the wireless device 115-*b* may transmit a negative acknowledgement (NACK) 320 or other indication that the downlink control information and/or the transport block could not be decoded to the base station 105-*b*.

In response to the NACK 320, the base station 105-*b* may transmit a second transmission 325. The second transmission 325 may include the transport block included in the first transmission 315. The second transmission 325 may also include other information sufficient to allow the wireless device 115-*b* to select the chosen $N_{RE}$ value from the set of candidate resource element parameters 305.

In some examples, the second transmission 325 may include an explicit indication of the chosen $N_{RE}$ value, even if no such explicit indication was included in the first transmission 315. The wireless device 115-*b* may determine the size of the transport block in second transmission 325 based at least in part on the explicit indication. In some examples, the base station 105-*b* may include an explicit indication of the chosen $N_{RE}$ value in the second transmission 325 when the base station 105-*b* does not know whether the failure was due to PDCCH failure or PDSCH failure.

In some examples, the second transmission 325 may not include additional data to assist the wireless device 115-*b* to select the chosen $N_{RE}$ value. For example, the second transmission 325 may not include additional data for use in assisting the wireless device 115-*b* to select the chosen $N_{RE}$ value when the set of candidate resource element parameters includes only a single entry (e.g., a single $N_{RE}$ value).

In some examples, the second transmission 325 may include the downlink control information included in the first transmission 315. The downlink control information in the second transmission 325 may have the same configuration as the downlink control information in the first transmission 315. However, if the derivation of the $N_{RE}$ value does not depend on the configuration of the downlink control information, the downlink control information may have a different configuration. The wireless device 115-*b* may determine the chosen $N_{RE}$ value based at least in part on the downlink control information as described with reference to block 225 of FIG. 2.

The wireless device 115-*b* may receive the second transmission 325 and process the transport block. In some examples, the wireless device 115-*b* may determine the chosen $N_{RE}$ value based on, e.g., the explicit indication of the chosen $N_{RE}$ value in the second transmission 325, the configuration of the downlink control information in the second transmission 325, and/or the values in the set of candidate resource element parameters 305. The wireless device 115-*b* may then process the second transmission 325 based at least in part on the chosen $N_{RE}$ value as described with reference to block 230 of FIG. 2. In some examples, the wireless device 115-*b* may calculate the size of the transport block in the second transmission 325 based at least in part on the chosen $N_{RE}$ value. In some examples, the wireless device 115-*b* may calculate channel state information (e.g., a channel quality indicator) based at least in part on the chosen $N_{RE}$ value.

Figure 4:
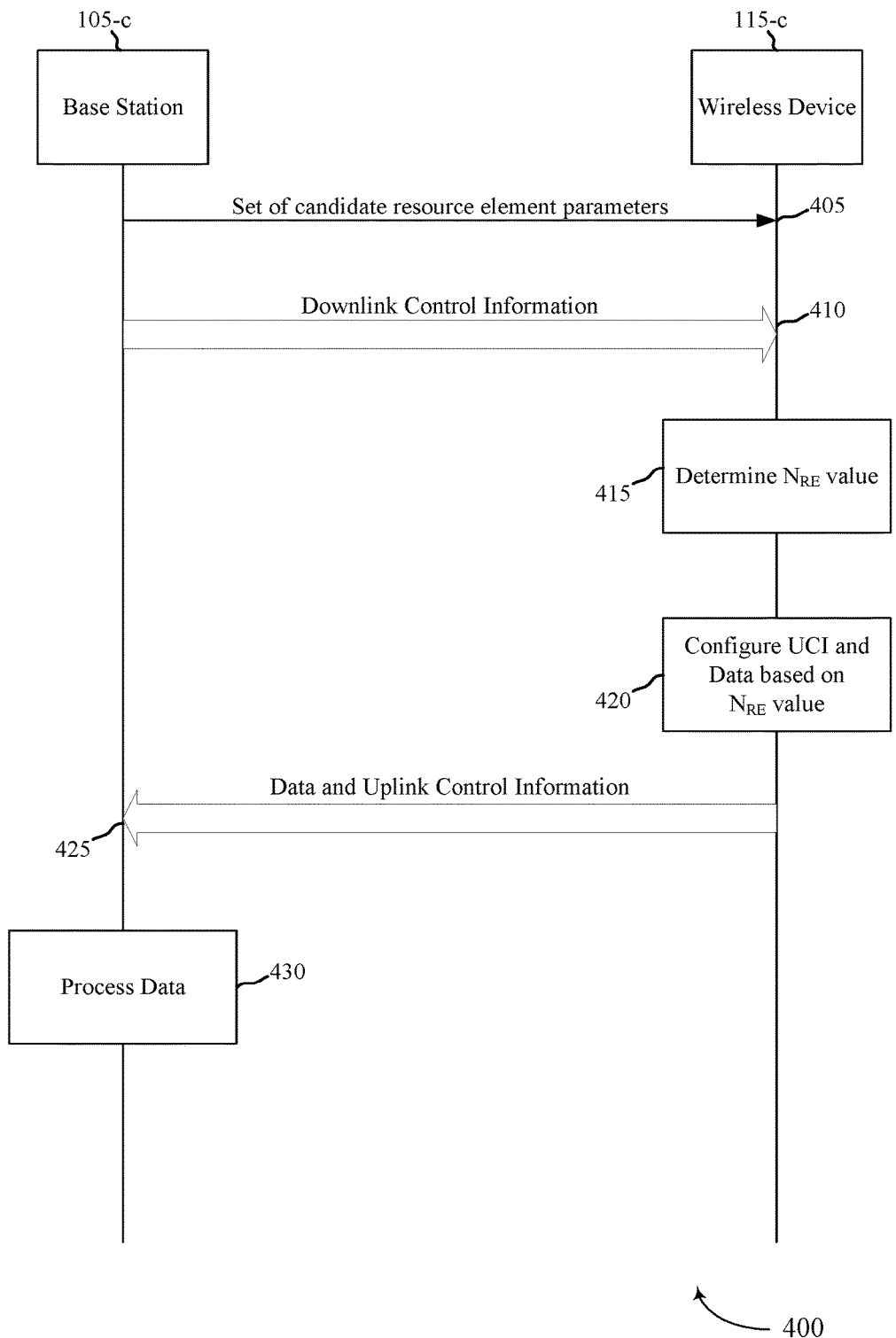
FIG. 4 illustrates an example of a communication flow that supports configuring a nominal number of resource elements in a data channel in accordance with aspects of the present disclosure.

FIG. 4 illustrates an example of a communication flow 400 that supports configuring a nominal number of resource elements in a data channel in accordance with various aspects of the present disclosure. In some examples, communication flow 400 may implement aspects of wireless communications system 100.

FIG. 4 shows a communication flow 400 between a base station 105-*c* and a wireless device 115-*c*. Base station 105-*c* may be an example of aspects of a base station 105 as described with reference to FIG. 1. Wireless device 115-*c* may be an example of aspects of a UE 115 as described with reference to FIG. 1.

The base station 105-*c* may transmit a set of candidate resource element parameters 405 to the wireless device 115-*c*. The set of candidate resource element parameters 405 may be an example of aspects of the set of candidate resource element parameters 215 described with reference to FIG. 2. In some examples, the set of candidate resource element parameters 405 may be a set of $N_{RE}$ values. In some examples, the set of $N_{RE}$ values may be specific to an uplink channel (e.g., PUSCH), and a different set of $N_{RE}$ values may be provided for the downlink channel (e.g., PDSCH).

The base station 105-*c* may transmit downlink control information 410 to the wireless device 115-*c*. The downlink control information 410 may be an example of aspects of the downlink control information in data and downlink control information 220 described with reference to FIG. 2. In some examples, the downlink control information 410 may include an explicit indication of a $N_{RE}$ value chosen from the set of $N_{RE}$ values.

The wireless device 115-*c* may determine the $N_{RE}$ value based at least in part on the downlink control information at 415. The wireless device 115-*c* may determine the chosen $N_{RE}$ value based at least in part on the downlink control information as described with reference to block 225 of FIG. 2. In some examples, the wireless device 115-*c* may determine the chosen $N_{RE}$ value based on the explicit indication of the chosen $N_{RE}$ value. In some examples, the wireless device 115-*c* may determine the chosen $N_{RE}$ value based at least in part on the configuration of the downlink control information 410.

The wireless device 115-*c* may configure uplink control information (UCI) and uplink data based at least in part on the determined $N_{RE}$ value at 420. In some examples, the wireless device 115-*c* may determine the size of a transport block in the uplink data based at least in part on the determined $N_{RE}$ value. In some examples, the wireless device 115-*c* may determine a configuration for the uplink control information based at least in part on the determined $N_{RE}$ value. The wireless device 115-*c* may transmit data and uplink control information 425 to the base station 105-*c*.

The base station 105-*c* may process the data at 430. The base station 105-*c* may process the data based on the $N_{RE}$ value used to configure the downlink control information 410. In some examples, the base station 105-*c* may calculate a transport block size for the data in the data and uplink control information 425 based on the $N_{RE}$ value used to configure the downlink control information 410. In some examples, the base station 105-*c* may calculate channel state information (e.g., a channel quality indicator) for an uplink channel such as the physical uplink shared channel (PUSCH)) based at least in part on the $N_{RE}$ value used to configure the downlink control information 410.

Figure 5:
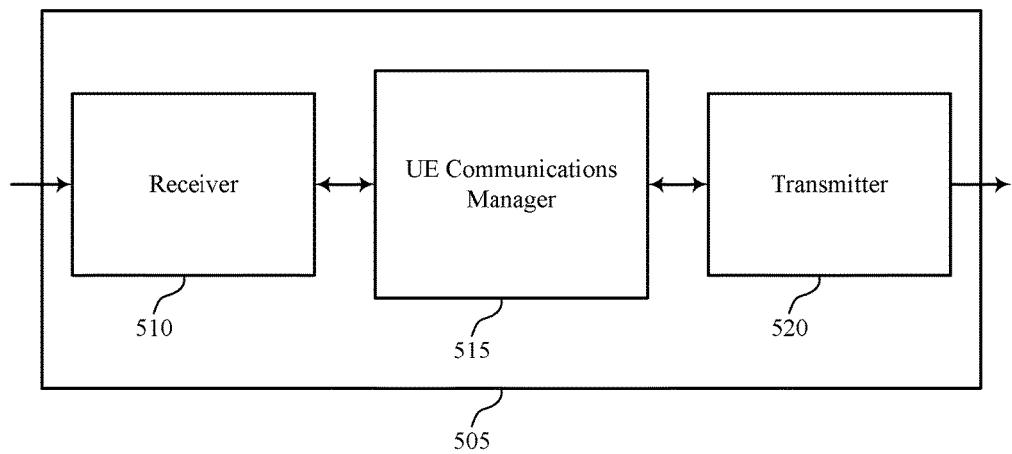
FIGS. 5 through 7 show block diagrams of a device that supports configuring a nominal number of resource elements in a data channel in accordance with aspects of the present disclosure.

FIG. 5 shows a block diagram 500 of a wireless device 505 that supports configuring a nominal number of resource elements in a data channel in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to configuring a nominal number of resource elements in a data channel, etc.). Information may be passed on to other components of the device. The receiver 510 may be an example of aspects of the transceiver 835 described with reference to FIG. 8. The receiver 510 may utilize a single antenna or a set of antennas.

Receiver 510 may receive, by a wireless device, a set of candidate resource element parameters, each candidate resource element parameter indicating a nominal number of physical resource block resource elements, receive downlink control information during a slot, receive a data transmission during the slot, receive the selection algorithm from the base station, receive, from a transmitting base station, an indication of whether aperiodic channel state information reference signals are to be taken into account when selecting the number of nominal resource elements, receive, from a transmitting base station, an indication of which reference signals are to be taken into account when selecting the number of nominal resource elements, and receive an indication of how the candidate resource element parameter is to be selected for the slot. In some cases, the explicit indication of the nominal number of physical resource block resource elements is included in a device-specific control search space. In some cases, the selection algorithm includes at least one of an algorithm for selecting the candidate resource element parameter corresponding to a slot configuration of the downlink control information, an algorithm for selecting the candidate resource element parameter corresponding to reference signal overhead of the downlink control information, and an algorithm for selecting the candidate resource element parameter corresponding to a number of physical downlink shared channel (PDSCH) symbols in the downlink control information. In some cases, the set of candidate resource element parameters is received in a radio resource control message. In some cases, the set of candidate resource element parameters is received in a medium access control (MAC) control element (CE) message. In some cases, the selection algorithm includes an algorithm for selecting the candidate resource element parameter closest to a number of resources that are available for data transmission in the slot.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may select one of the candidate resource element parameters based on the downlink control information and process the data transmission based on the nominal number of physical resource block resource elements indicated by the selected candidate resource element parameter. The UE communications manager 515 may also select one of the candidate resource element parameters based on the downlink control information and configure uplink control information and an uplink data transmission based on the selected candidate resource element parameter.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Transmitter 520 may transmit the channel state information to a base station and transmit the additional channel state information to the base station.

Figure 6:
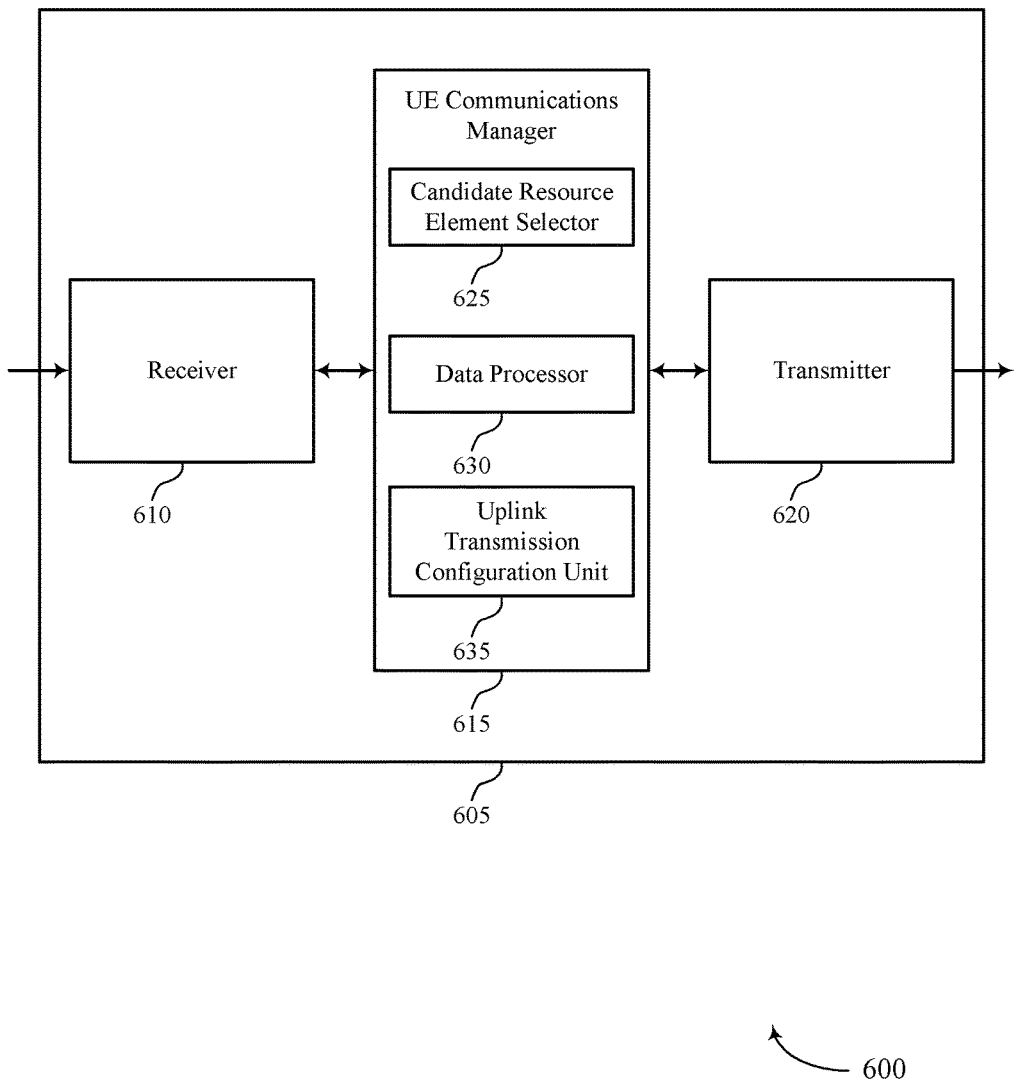

FIG. 6 shows a block diagram 600 of a wireless device 605 that supports configuring a nominal number of resource elements in a data channel in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to configuring a nominal number of resource elements in a data channel, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include candidate resource element selector 625, data processor 630, and uplink transmission configuration unit 635.

Candidate resource element selector 625 may select one of the candidate resource element parameters based on the downlink control information. In some cases, the downlink control information includes an explicit indication of the nominal number of physical resource block resource elements, and where the candidate resource element parameter is selected based on the explicit indication. In some cases, selecting the candidate resource element parameter based on the downlink control information includes: selecting the number of nominal resource elements based on a configuration of the downlink control information. In some cases, selecting the candidate resource element parameter based on the configuration of the downlink control information includes: using a selection algorithm known to the UE and a base station to select the candidate resource element parameter. In some cases, the candidate resource element parameter is selected based on a slot identifier in the downlink control information, reference signal overhead in the downlink control information, and a number of symbols containing a data channel configuration in the downlink control information.

Data processor 630 may process the data transmission based on the nominal number of physical resource block resource elements indicated by the selected candidate resource element parameter.

Uplink transmission configuration unit 635 may configure uplink control information and an uplink data transmission based on the selected candidate resource element parameter.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
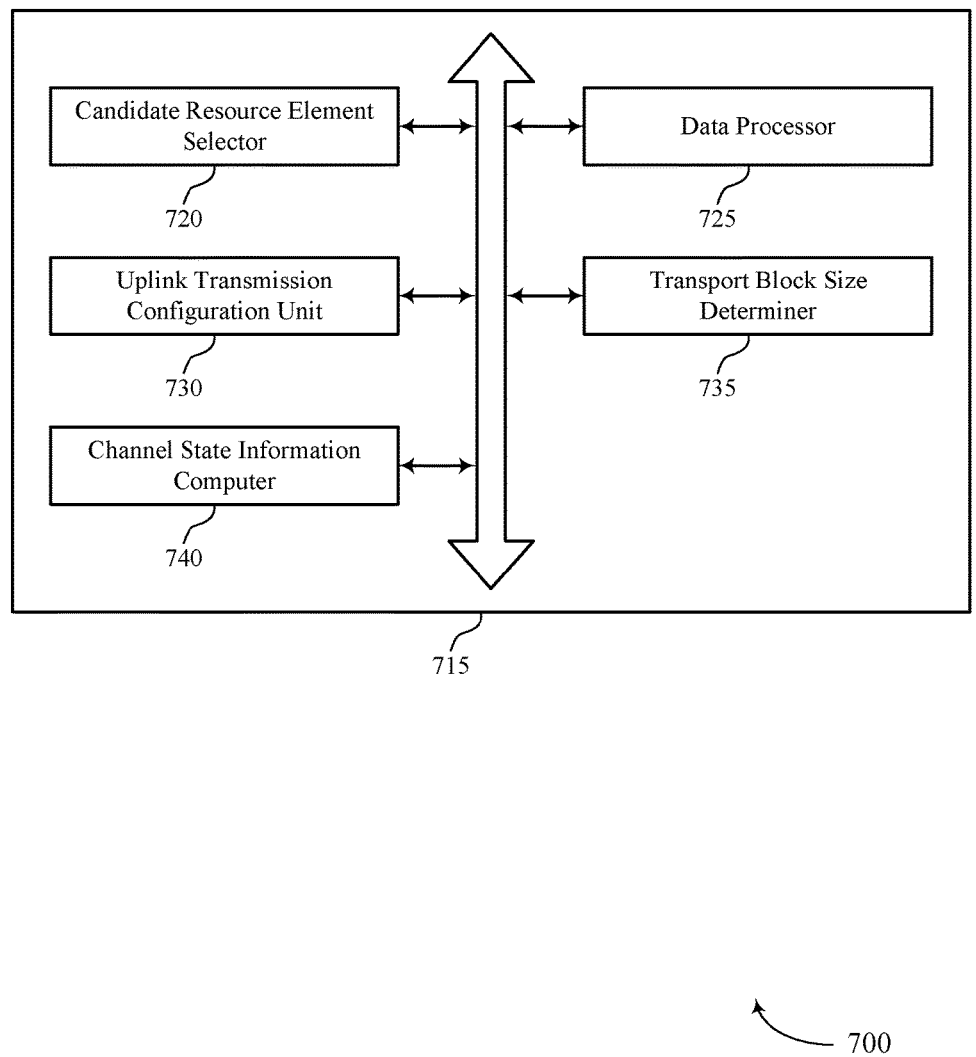

FIG. 7 shows a block diagram 700 of a UE communications manager 715 that supports configuring a nominal number of resource elements in a data channel in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include candidate resource element selector 720, data processor 725, uplink transmission configuration unit 730, transport block size determiner 735, and channel state information computer 740. Each of these modules may communicate, directly or indirectly, with one another (e.g., via one or more buses).

Candidate resource element selector 720 may select one of the candidate resource element parameters based on the downlink control information. In some cases, the downlink control information includes an explicit indication of the nominal number of physical resource block resource elements, and where the candidate resource element parameter is selected based on the explicit indication. In some cases, selecting the candidate resource element parameter based on the downlink control information includes: selecting the number of nominal resource elements based on a configuration of the downlink control information. In some cases, selecting the candidate resource element parameter based on the configuration of the downlink control information includes: using a selection algorithm known to the UE and a base station to select the candidate resource element parameter. In some cases, the candidate resource element parameter is selected based on a slot identifier in the downlink control information, reference signal overhead in the downlink control information, and a number of symbols containing a data channel configuration in the downlink control information.

Data processor 725 may process the data transmission based on the nominal number of physical resource block resource elements indicated by the selected candidate resource element parameter.

Uplink transmission configuration unit 730 may configure uplink control information and an uplink data transmission based on the selected candidate resource element parameter.

Transport block size determiner 735 may determine a transport block size for the data transmission based on the selected nominal number of physical resource block resource elements.

Channel state information computer 740 may compute additional channel state information for the physical downlink channel based on a second candidate resource element parameter, where the second candidate resource element parameter is adjacent to the first second candidate resource element parameter in the set of candidate resource element parameters. In some cases, processing the data transmission includes: computing channel state information for the physical downlink channel based on the selected number of nominal resource elements. In some cases, the channel state information includes a channel quality indicator.

Figure 8:
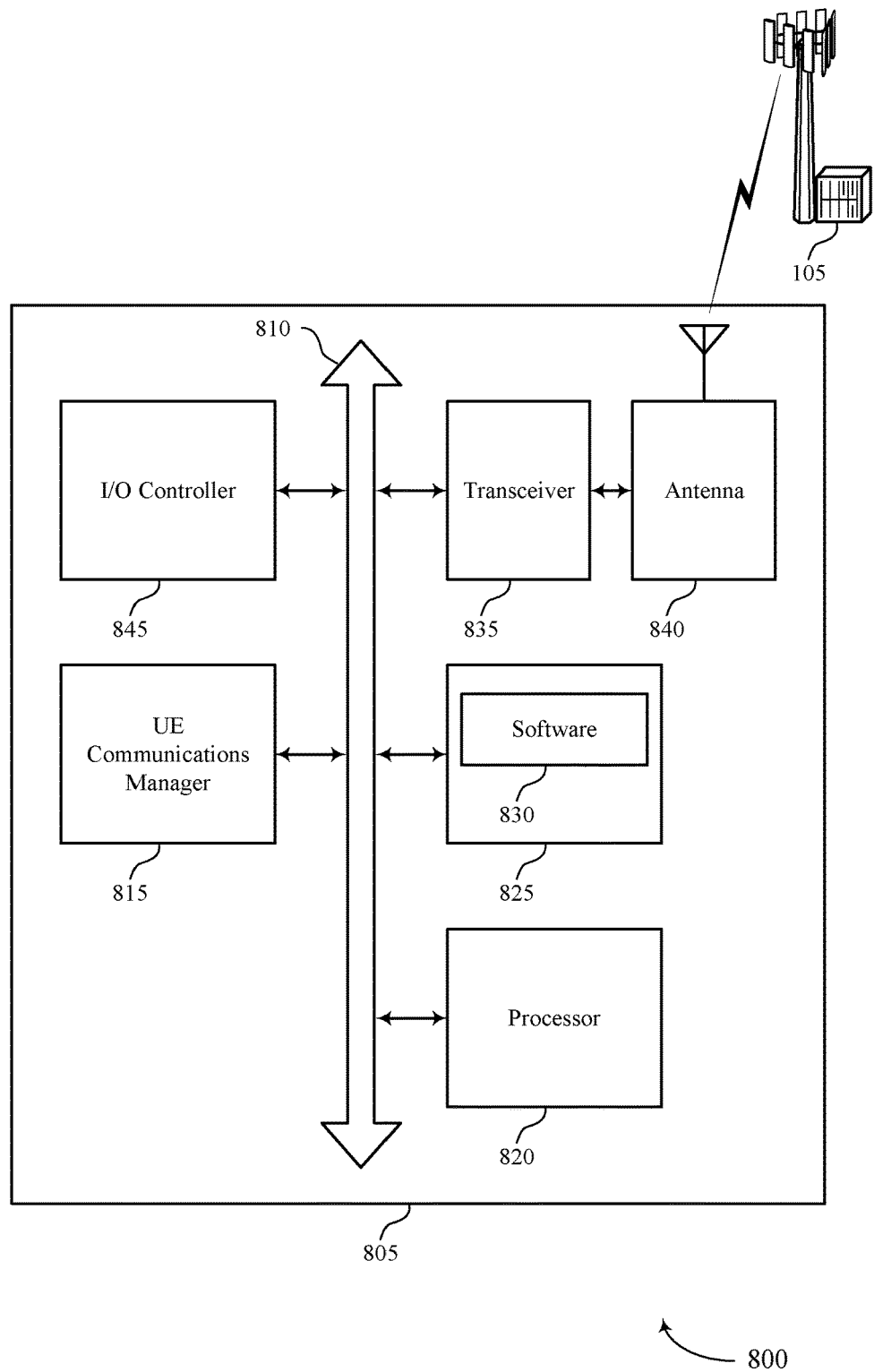
FIG. 8 illustrates a block diagram of a system including a UE that supports configuring a nominal number of resource elements in a data channel in accordance with aspects of the present disclosure.

FIG. 8 shows a diagram of a system 800 including a device 805 that supports configuring a nominal number of resource elements in a data channel in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting configuring a nominal number of resource elements in a data channel).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support configuring a nominal number of resource elements in a data channel. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
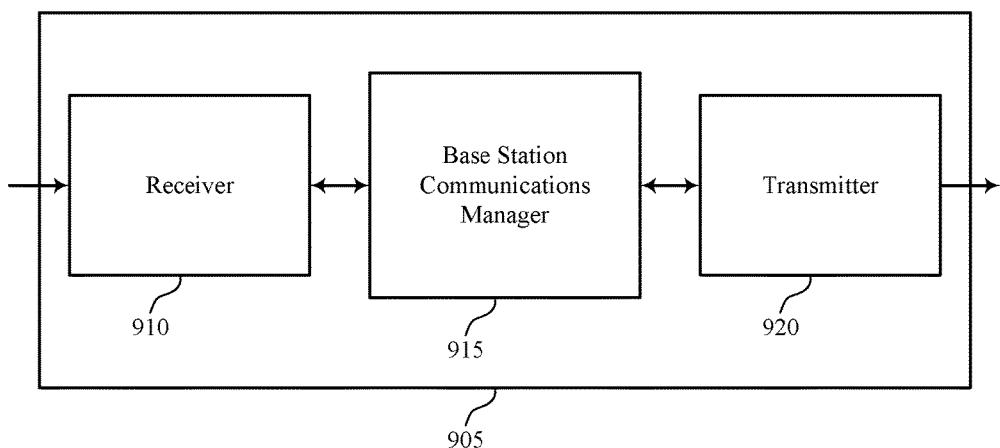
FIGS. 9 through 11 show block diagrams of a device that supports configuring a nominal number of resource elements in a data channel in accordance with aspects of the present disclosure.

FIG. 9 shows a block diagram 900 of a wireless device 905 that supports configuring a nominal number of resource elements in a data channel in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to configuring a nominal number of resource elements in a data channel, etc.). Information may be passed on to other components of the device. The receiver 910 may be an example of aspects of the transceiver 1235 described with reference to FIG. 12. The receiver 910 may utilize a single antenna or a set of antennas.

Receiver 910 may receive, from the wireless device, a negative acknowledgement indicating that the wireless device was unable to decode at least one of the downlink control information and the transport block.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may generate downlink control information and a transport block based on one of the candidate resource element parameters chosen from the set of candidate resource element parameters and transmit a second transmission including the transport block to the receiving device, where the base station transmits the second transmission to the receiving device such that the wireless device has sufficient information to select the chosen one of the candidate resource element parameters from the set of candidate resource element parameters.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Transmitter 920 may transmit, by a base station, a set of candidate resource element parameters, each candidate resource element parameter indicating a nominal number of physical resource block resource elements and transmit a first transmission including the downlink control information and the transport block to a wireless device.

Figure 10:
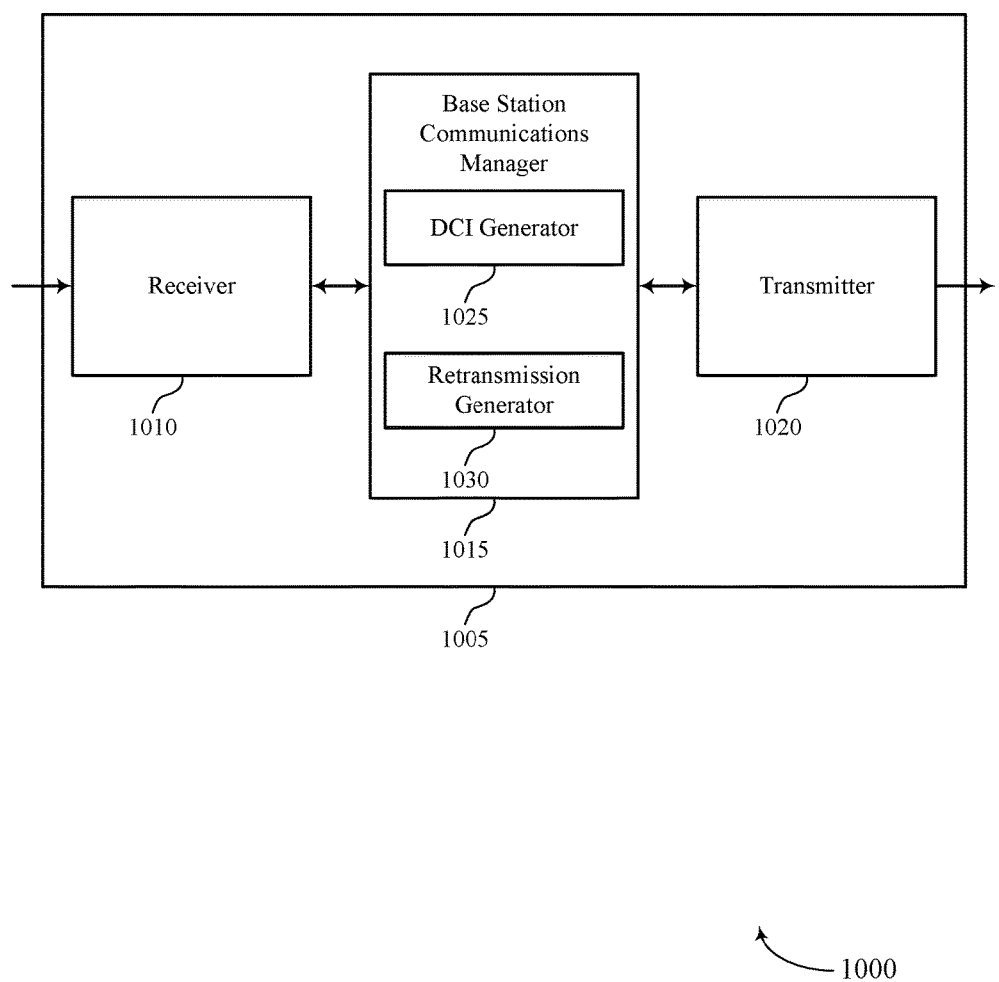

FIG. 10 shows a block diagram 1000 of a wireless device 1005 that supports configuring a nominal number of resource elements in a data channel in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to configuring a nominal number of resource elements in a data channel, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include downlink control information (DCI) generator 1025 and retransmission generator 1030.

DCI generator 1025 may generate downlink control information and a transport block based on one of the candidate resource element parameters chosen from the set of candidate resource element parameters.

Retransmission generator 1030 may transmit a second transmission including the transport block to the receiving device, where the base station transmits the second transmission to the receiving device such that the wireless device has sufficient information to select the chosen one of the candidate resource element parameters from the set of candidate resource element parameters. In some cases, the second transmission includes an explicit indication of the chosen one of the candidate resource element parameters. In some cases, the set of candidate resource element parameters includes only a single entry. In some cases, the second transmission includes the downlink control information. In some cases, the downlink control information has a same slot configuration and a same reference signal overhead in the first transmission and the second transmission.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
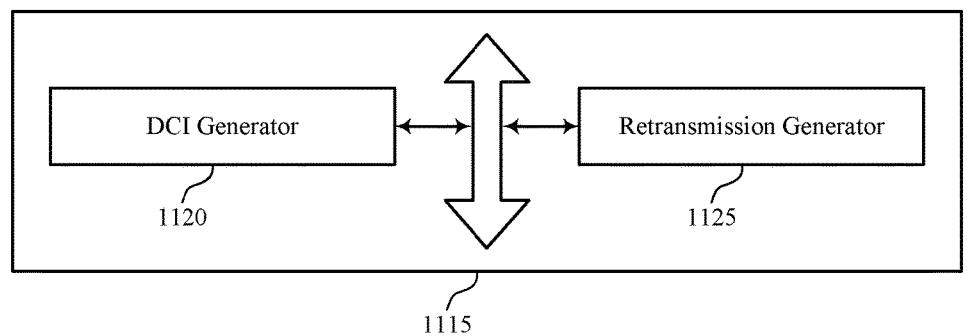

FIG. 11 shows a block diagram 1100 of a base station communications manager 1115 that supports configuring a nominal number of resource elements in a data channel in accordance with aspects of the present disclosure. The base station communications manager 1115 may be an example of aspects of a base station communications manager 1215 described with reference to FIGS. 9, 10, and 12. The base station communications manager 1115 may include DCI generator 1120 and retransmission generator 1125. Each of these modules may communicate, directly or indirectly, with one another (e.g., via one or more buses).

DCI generator 1120 may generate downlink control information and a transport block based on one of the candidate resource element parameters chosen from the set of candidate resource element parameters.

Retransmission generator 1125 may transmit a second transmission including the transport block to the receiving device, where the base station transmits the second transmission to the receiving device such that the wireless device has sufficient information to select the chosen one of the candidate resource element parameters from the set of candidate resource element parameters. In some cases, the second transmission includes an explicit indication of the chosen one of the candidate resource element parameters. In some cases, the set of candidate resource element parameters includes only a single entry. In some cases, the second transmission includes the downlink control information. In some cases, the downlink control information has a same slot configuration and a same reference signal overhead in the first transmission and the second transmission.

Figure 12:
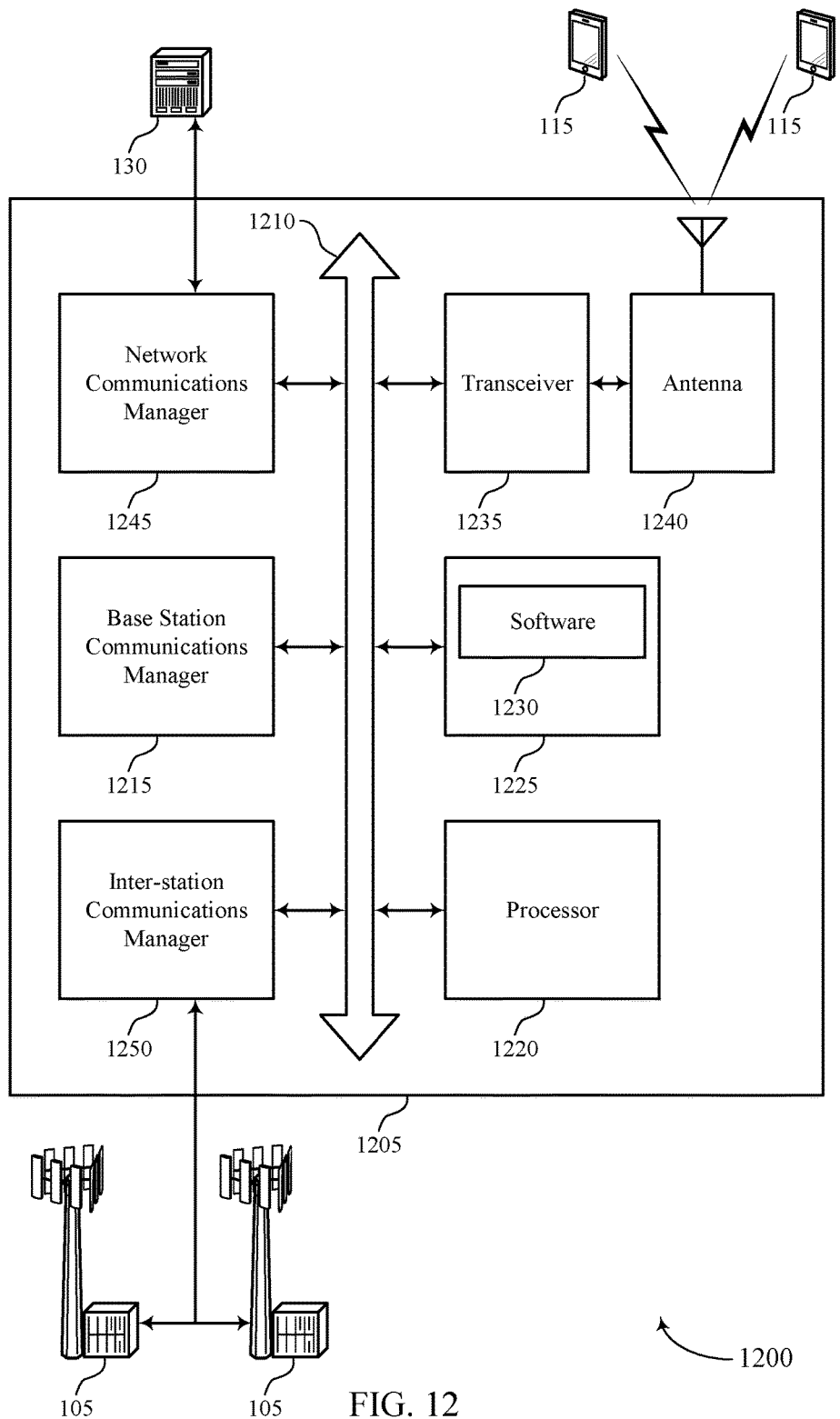
FIG. 12 illustrates a block diagram of a system including a base station that supports configuring a nominal number of resource elements in a data channel in accordance with aspects of the present disclosure.

FIG. 12 shows a diagram of a system 1200 including a device 1205 that supports configuring a nominal number of resource elements in a data channel in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting configuring a nominal number of resource elements in a data channel).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support configuring a nominal number of resource elements in a data channel. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
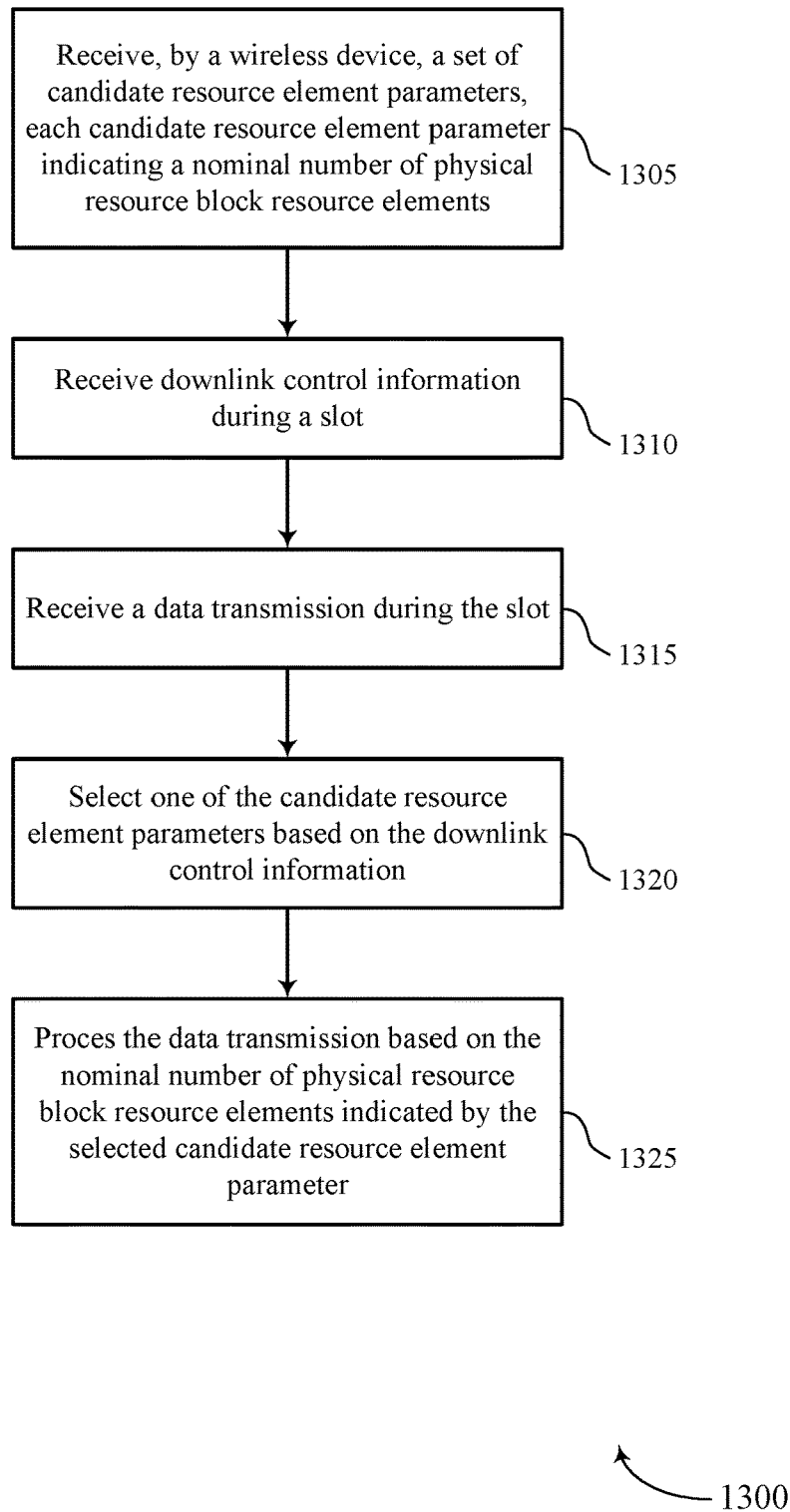
FIGS. 13 through 15 illustrate methods for configuring a nominal number of resource elements in a data channel in accordance with aspects of the present disclosure.

FIG. 13 shows a flowchart illustrating a method 1300 for configuring a nominal number of resource elements in a data channel in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive, by a wireless device, a set of candidate resource element parameters, each candidate resource element parameter indicating a nominal number of physical resource block resource elements. The operations of block 1305 may be performed according to the methods described herein. In certain examples, aspects of the operations of block 1305 may be performed by a receiver as described with reference to FIGS. 5 through 8.

At block 1310 the UE 115 may receive downlink control information during a slot. The operations of block 1310 may be performed according to the methods described herein. In certain examples, aspects of the operations of block 1310 may be performed by a receiver as described with reference to FIGS. 5 through 8.

At block 1315 the UE 115 may receive a data transmission during the slot. The operations of block 1315 may be performed according to the methods described herein. In certain examples, aspects of the operations of block 1315 may be performed by a receiver as described with reference to FIGS. 5 through 8.

At block 1320 the UE 115 may select one of the candidate resource element parameters based at least in part on the downlink control information. The operations of block 1320 may be performed according to the methods described herein. In certain examples, aspects of the operations of block 1320 may be performed by a candidate resource element selector as described with reference to FIGS. 5 through 8.

At block 1325 the UE 115 may process the data transmission based at least in part on the nominal number of physical resource block resource elements indicated by the selected candidate resource element parameter. The operations of block 1325 may be performed according to the methods described herein. In certain examples, aspects of the operations of block 1325 may be performed by a data processor as described with reference to FIGS. 5 through 8.

Figure 14:
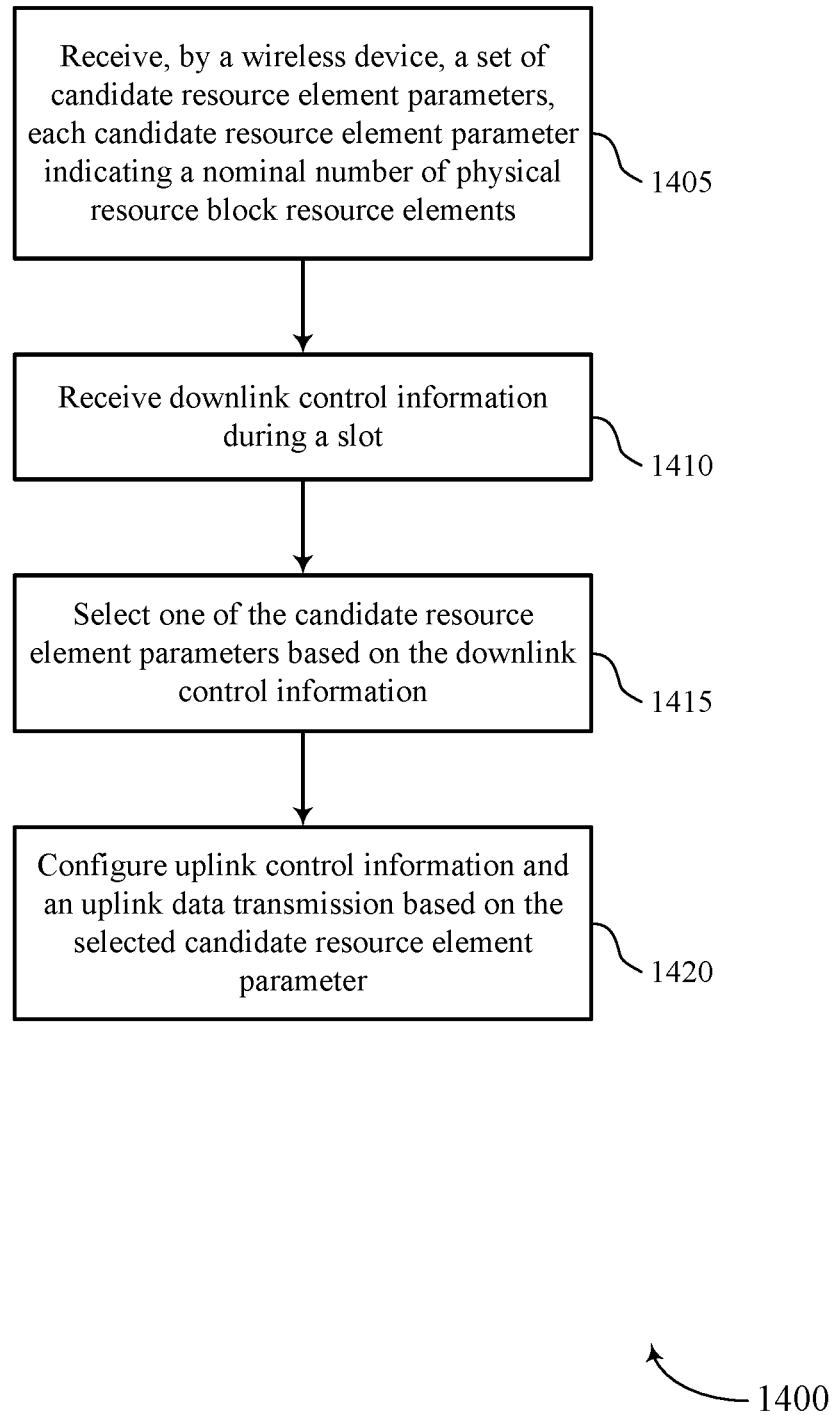

FIG. 14 shows a flowchart illustrating a method 1400 for configuring a nominal number of resource elements in a data channel in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, by a wireless device, a set of candidate resource element parameters, each candidate resource element parameter indicating a nominal number of physical resource block resource elements. The operations of block 1405 may be performed according to the methods described herein. In certain examples, aspects of the operations of block 1405 may be performed by a receiver as described with reference to FIGS. 5 through 8.

At block 1410 the UE 115 may receive downlink control information during a slot. The operations of block 1410 may be performed according to the methods described herein. In certain examples, aspects of the operations of block 1410 may be performed by a receiver as described with reference to FIGS. 5 through 8.

At block 1415 the UE 115 may select one of the candidate resource element parameters based at least in part on the downlink control information. The operations of block 1415 may be performed according to the methods described herein. In certain examples, aspects of the operations of block 1415 may be performed by a candidate resource element selector as described with reference to FIGS. 5 through 8.

At block 1420 the UE 115 may configure uplink control information and an uplink data transmission based at least in part on the selected candidate resource element parameter. The operations of block 1420 may be performed according to the methods described herein. In certain examples, aspects of the operations of block 1420 may be performed by a uplink transmission configuration unit as described with reference to FIGS. 5 through 8.

Figure 15:
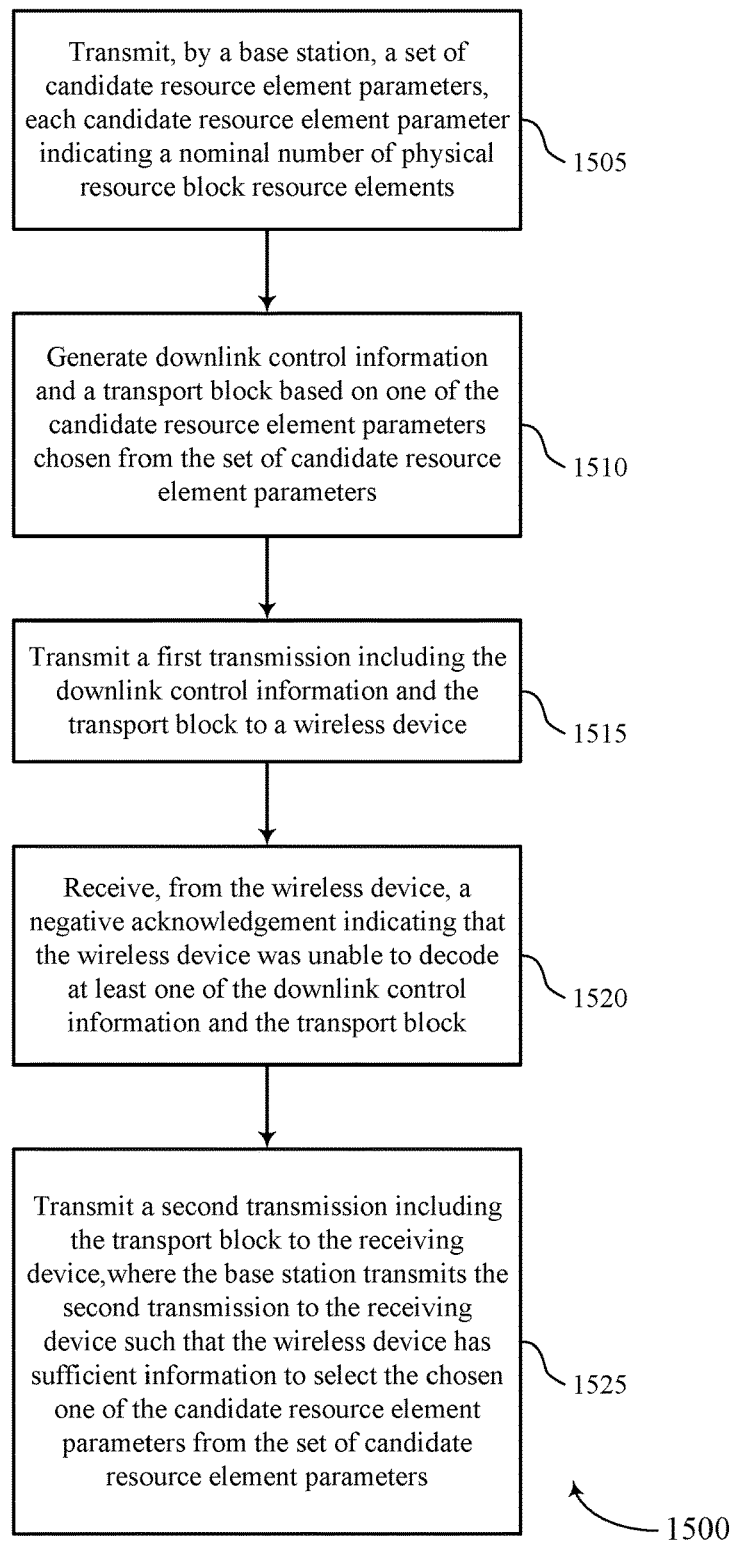

FIG. 15 shows a flowchart illustrating a method 1500 for configuring a nominal number of resource elements in a data channel in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit, by a base station, a set of candidate resource element parameters, each candidate resource element parameter indicating a nominal number of physical resource block resource elements. The operations of block 1505 may be performed according to the methods described herein. In certain examples, aspects of the operations of block 1505 may be performed by a transmitter as described with reference to FIGS. 9 through 12.

At block 1510 the base station 105 may generate downlink control information and a transport block based at least in part on one of the candidate resource element parameters chosen from the set of candidate resource element parameters. The operations of block 1510 may be performed according to the methods described herein. In certain examples, aspects of the operations of block 1510 may be performed by a DCI generator as described with reference to FIGS. 9 through 12.

At block 1515 the base station 105 may transmit a first transmission comprising the downlink control information and the transport block to a wireless device. The operations of block 1515 may be performed according to the methods described herein. In certain examples, aspects of the operations of block 1515 may be performed by a transmitter as described with reference to FIGS. 9 through 12.

At block 1520 the base station 105 may receive, from the wireless device, a negative acknowledgement indicating that the wireless device was unable to decode at least one of the downlink control information and the transport block. The operations of block 1520 may be performed according to the methods described herein. In certain examples, aspects of the operations of block 1520 may be performed by a receiver as described with reference to FIGS. 9 through 12.

At block 1525 the base station 105 may transmit a second transmission comprising the transport block to the receiving device, wherein the base station transmits the second transmission to the receiving device such that the wireless device has sufficient information to select the chosen one of the candidate resource element parameters from the set of candidate resource element parameters. The operations of block 1525 may be performed according to the methods described herein. In certain examples, aspects of the operations of block 1525 may be performed by a retransmission generator as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the communication links used in the wireless communications system 100 of FIG. 1 or the communication flow 200 of FIG. 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

In a first example, the presently disclosed subject matter may include methods, systems, and/or non-transitory computer readable media for receiving, by a wireless device, a set of candidate resource element parameters, each candidate resource element parameter indicating a nominal number of physical resource block resource elements; receiving downlink control information during a slot; receiving a data transmission during the slot; selecting one of the candidate resource element parameters based at least in part on the downlink control information; and processing the data transmission based at least in part on the nominal number of physical resource block resource elements indicated by the selected candidate resource element parameter.

In a second example, the presently disclosed subject matter may include methods, systems, and/or non-transitory computer readable media for receiving, by a wireless device, downlink control information during a slot; receiving a data transmission during the slot; selecting a candidate resource element parameters from a set of candidate resource element parameters based at least in part on the downlink control information, wherein each candidate resource element parameter in the set of candidate resource element parameters indicates a nominal number of physical resource block resource elements; and processing the data transmission based at least in part on the nominal number of physical resource block resources elements indicated by the selected candidate resource element parameter.

In a third example, the presently disclosed subject matter may include methods, systems, and/or non-transitory computer readable media as described with respect to the second example, further including receiving the set of candidate resource element parameters.

In a fourth example, the presently disclosed subject matter may include methods, systems, and/or non-transitory computer readable media as described with respect to any of the first through third examples, wherein processing the data transmission includes determining a transport block size for the data transmission based at least in part on the selected nominal number of physical resource block resource elements.

In a fifth example, the presently disclosed subject matter may include methods, systems, and/or non-transitory computer readable media as described with respect to any of the first through fourth examples, wherein processing the data transmission includes computing channel state information for the physical downlink channel based at least in part on the selected number of nominal resources.

In a sixth example, the presently disclosed subject matter may include methods, systems, and/or non-transitory computer readable media as described with respect to the fifth example, further including transmitting the channel state information to a base station.

In a seventh example, the presently disclosed subject matter may include methods, systems, and/or non-transitory computer readable media as described with respect to any of the fifth or sixth examples, further including computing additional channel state information for the physical downlink channel based at least in part on a second candidate resource element parameter, wherein the second candidate resource element parameter is adjacent the selected candidate resource element parameter in the set of candidate resource element parameters.

In an eighth example, the presently disclosed subject matter may include methods, systems, and/or non-transitory computer readable media as described with respect to the seventh example, further including transmitting the additional channel state information to the base station.

In a ninth example, the presently disclosed subject matter may include methods, systems, and/or non-transitory computer readable media as described with respect to any of the first through eighth examples, further including receiving an indication of how the candidate resource element parameter is to be selected for the slot.

In a tenth example, the presently disclosed subject matter may include methods, systems, and/or non-transitory computer readable media as described with respect to any of the first through ninth examples, wherein the downlink control information includes an explicit indication of the nominal number of physical resource block resource elements, and wherein the candidate resource element parameter is selected based at least in part on the explicit indication.

In an eleventh example, the presently disclosed subject matter may include methods, systems, and/or non-transitory computer readable media as described with respect to the tenth example, wherein the explicit indication of the nominal number of physical resource block resource elements is included in a device-specific control search space.

In a twelfth example, the presently disclosed subject matter may include methods, systems, and/or non-transitory computer readable media as described with respect to any of the first through eleventh examples, wherein selecting the candidate resource element parameter includes selecting the number of nominal resource elements based at least in part on a configuration of the downlink control information.

In a thirteenth example, the presently disclosed subject matter may include methods, systems, and/or non-transitory computer readable media as described with respect to any of the first through twelfth examples, wherein selecting the candidate resource element parameter includes using a selection algorithm known to the wireless device and a base station to select the candidate resource element parameter.

In an fourteenth example, the presently disclosed subject matter may include methods, systems, and/or non-transitory computer readable media as described with respect to the thirteenth example, further including receiving the selection algorithm from the base station.

In a fifteenth example, the presently disclosed subject matter may include methods, systems, and/or non-transitory computer readable media as described with respect to any of the thirteenth or fourteenth examples, wherein the selection algorithm is at least one of an algorithm for selecting the candidate resource element parameter corresponding to a slot configuration of the downlink control information, an algorithm for selecting the candidate resource element parameter corresponding to reference signal overhead of the downlink control information, and an algorithm for selecting the candidate resource element parameter corresponding to a number of physical downlink shared channel (PDSCH) symbols in the downlink control information.

In a sixteenth example, the presently disclosed subject matter may include methods, systems, and/or non-transitory computer readable media as described with respect to any of the thirteenth or fourteenth examples, wherein the selection algorithm is an algorithm for selecting the candidate resource element parameter closest to a number of resources for data transmission that are available in the slot.

In a seventeenth example, the presently disclosed subject matter may include methods, systems, and/or non-transitory computer readable media as described with respect to any of the first through sixteenth examples, further including receiving, from a transmitting base station, an indication of whether aperiodic channel state information reference signals are to be taken into account when selecting the number of nominal resource elements.

In an eighteenth example, the presently disclosed subject matter may include methods, systems, and/or non-transitory computer readable media as described with respect to any of the first through sixteenth examples, further including receiving, from a transmitting base station, an indication of which reference signals are to be taken into account when selecting the number of nominal resource elements.

In a nineteenth example, the presently disclosed subject matter may include methods, systems, and/or non-transitory computer readable media as described with respect to any of the first through eighteenth examples, wherein the candidate resource element parameter is selected based at least in part on a slot identifier in the downlink control information, reference signal overhead in the downlink control information, and a number of symbols containing a data channel configuration in the downlink control information.

In a twentieth example, the presently disclosed subject matter may include methods, systems, and/or non-transitory computer readable media as described with respect to any of the fifth through nineteenth examples, wherein the channel state information includes a channel quality indicator.

In a twenty-first example, the presently disclosed subject matter may include methods, systems, and/or non-transitory computer readable media as described with respect to any of the first through twentieth examples, wherein the set of candidate resource element parameters is received in a radio resource control (RRC) message.

In a twenty-second example, the presently disclosed subject matter may include methods, systems, and/or non-transitory computer readable media as described with respect to any of the first through twentieth examples, wherein the set of candidate resource element parameters is received in a medium access control (MAC) control element (CE) message.

In a twenty-third example, the presently disclosed subject matter may include methods, systems, and/or non-transitory computer readable media for receiving, by a wireless device, a set of candidate resource element parameters, each candidate resource element parameter indicating a nominal number of physical resource block resource elements; receiving downlink control information during a slot; selecting one of the candidate resource element parameters based at least in part on the downlink control information; and configuring uplink control information and an uplink data transmission based at least in part on the selected candidate resource element parameter.

In a twenty-fourth example, the presently disclosed subject matter may include methods, systems, and/or non-transitory computer readable media for receiving, by a wireless device, downlink control information during a slot; selecting a candidate resource element parameters from a set of candidate resource element parameters based at least in part on the downlink control information, wherein each candidate resource element parameter in the set of candidate resource element parameters indicates a nominal number of physical resource block resource elements; and configuring uplink control information and an uplink data transmission based at least in part on the selected candidate resource element parameter.

In a twenty-fifth example, the presently disclosed subject matter may include methods, systems, and/or non-transitory computer readable media as described with respect to the twenty-fourth example, further including receiving the set of candidate resource element parameters.

In a twenty-sixth example, the presently disclosed subject matter may include methods, systems, and/or non-transitory computer readable media as described with respect to any of the twenty-third through twenty-fifth examples, further including the features described in any of the fourth through twenty-second examples. To the extent that the fourth through twenty-second examples described aspects of processing a downlink data transmission, those features may be performed as part of configuring the uplink data transmission.

In a twenty-seventh example, the presently disclosed subject matter may include methods, systems, and/or non-transitory computer readable media for transmitting, by a base station, a set of candidate resource element parameters, each candidate resource element parameter indicating a nominal number of physical resource block resource elements; generating downlink control information and a transport block based at least in part on one of the candidate resource element parameters chosen from the set of candidate resource element parameters; transmitting a first transmission comprising the downlink control information and the transport block to the a wireless device; receiving, from the wireless device, a negative acknowledgement indicating that the wireless device was unable to decode at least one of the downlink control information and the transport block; and transmitting a second transmission including the transport block to the wireless device, wherein the base station transmits the second transmission to the wireless device such that the wireless device has sufficient information to select the chosen one of the candidate resource element parameters from the set of candidate resource element parameters.

In a twenty-eighth example, the presently disclosed subject matter may include methods, systems, and/or non-transitory computer readable media for generating downlink control information and a transport block based at least in part on a candidate resource element parameter chosen from a set of candidate resource element parameters, wherein each resource element parameter in the set of candidate resource element parameters indicates a nominal number of physical resource block resource elements; and transmitting a first transmission including the downlink control information and the transport block to a wireless device.

In a twenty-ninth example, the presently disclosed subject matter may include methods, systems, and/or non-transitory computer readable media as described with respect to the twenty-eighth example, further including receiving, from the wireless device, a negative acknowledgement indicating that the wireless device was unable to decode at least one of the downlink control information and the transport block; and transmitting a second transmission including the transport block to the wireless device, wherein the base station transmits the second transmission to the wireless device such that the wireless device has sufficient information to select the chosen one of the candidate resource element parameters from the set of candidate resource element parameters.

In a thirtieth example, the presently disclosed subject matter may include methods, systems, and/or non-transitory computer readable media as described with respect to any of the twenty-eighth through twenty-ninth examples, further including transmitting the set of candidate resource element parameters.

In a thirty-first example, the presently disclosed subject matter may include methods, systems, and/or non-transitory computer readable media as described with respect to any of the twenty-seventh through thirtieth examples, wherein the second transmission includes an explicit indication of the chosen one of the candidate resource element parameters.

In a thirty-second example, the presently disclosed subject matter may include methods, systems, and/or non-transitory computer readable media as described with respect to any of the twenty-seventh through thirty-first examples, wherein the set of candidate resource element parameters includes only a single entry.

In a thirty-second example, the presently disclosed subject matter may include methods, systems, and/or non-transitory computer readable media as described with respect to any of the twenty-seventh through thirty-first examples, wherein the second transmission includes the downlink control information.

In a thirty-third example, the presently disclosed subject matter may include methods, systems, and/or non-transitory computer readable media as described with respect to any of the twenty-seventh through thirty-second examples, wherein the downlink control information has the same slot configuration and the same reference signal overhead in the first transmission and the second transmission.

What is claimed is:

1. A method for wireless communication, comprising:
   receiving, by a wireless device, downlink control information;
   receiving a data transmission assigned by the downlink control information;
   determining a number of resource elements per physical resource block based at least in part on the downlink control information, wherein the number of resource elements per physical resource block is determined based at least in part on a reference signal overhead indicated by the downlink control information or a number of physical downlink shared channel (PDSCH) symbols allocated by the downlink control information; and
   processing the data transmission based at least in part on the determined number of resource elements per physical resource block.

2. The method of claim 1, wherein:
   determining the number of resource elements per physical resource block based at least in part on the downlink control information comprises: selecting a candidate resource element parameter from a set of candidate resource element parameters based at least in part on the downlink control information, wherein each candidate resource element parameter in the set of candidate resource element parameters indicates a respective number of resource elements per physical resource block.

3. The method of claim 1, wherein:
   processing the data transmission comprises: determining a transport block size for the data transmission based at least in part on the determined number of resource elements per physical resource block.

4. The method of claim 1, wherein:
   the downlink control information comprises an explicit indication of the number of resource elements per physical resource block, and wherein the number of resource elements per physical resource block is determined based at least in part on the explicit indication.

5. The method of claim 4, wherein:
   the explicit indication of the number of resource elements per physical resource block is included in a device-specific control search space.

6. The method of claim 1, wherein:
   determining the number of resource elements per physical resource block based at least in part on the downlink control information comprises: determining the number of resource elements based at least in part on a configuration of the downlink control information.

7. The method of claim 6, wherein:
determining the number of resource elements per physical resource block based at least in part on the configuration of the downlink control information comprises: using a selection algorithm known to the wireless device and a base station to determine the number of resource elements per physical resource block.

8. The method of claim 7, wherein:
the selection algorithm comprises at least one of an algorithm for determining the number of resource elements per physical resource block corresponding to a slot configuration of the downlink control information, an algorithm for determining the number of resource elements per physical resource block based at least in part on the reference signal overhead indicated by the downlink control information, and an algorithm for determining the number of resource elements per physical resource block based at least in part on the number of PDSCH symbols allocated by the downlink control information.

9. The method of claim 7, wherein:
the selection algorithm comprises an algorithm for determining the number of resource elements per physical resource block closest to a number of resources for data transmission that are available in the slot.

10. The method of claim 4, further comprising:
receiving, from a transmitting base station, an indication of whether aperiodic channel state information reference signals are to be taken into account when determining the number of resource elements per physical resource block.

11. The method of claim 4, further comprising:
receiving, from a transmitting base station, an indication of which reference signals are to be taken into account when determining the number of resource elements per physical resource block.

12. The method of claim 6, wherein:
the number of resource elements per physical resource block is determined based at least in part on the reference signal overhead indicated by the downlink control information and the number of PDSCH symbols allocated by the downlink control information.

13. The method of claim 2, wherein:
the set of candidate resource element parameters is received in a radio resource control message.

14. The method of claim 2, wherein:
the set of candidate resource element parameters comprises at least one candidate nominal number of resource elements per physical resource block.

15. The method of claim 2, wherein:
the set of candidate resource element parameters comprises at least one indication of a candidate nominal number of resource elements per physical resource block.

16. A method for wireless communication, comprising:
receiving, by a wireless device, downlink control information;
determining a number of resource elements per physical resource block based at least in part on the downlink control information, wherein the number of resource elements per physical resource block is determined based at least in part on a reference signal overhead indicated by the downlink control information or a number of physical downlink shared channel (PDSCH) symbols allocated by the downlink control information; and
configuring an uplink data transmission based at least in part on the determined number of resource elements per physical resource block.

17. The method of claim 16, wherein:
determining the number of resource elements per physical resource block based at least in part on the downlink control information comprises: selecting a candidate resource element parameter from a set of candidate resource element parameters based at least in part on the downlink control information, wherein each candidate resource element parameter in the set of candidate resource element parameters indicates a respective number of resource elements per physical resource block.

18. The method of claim 16, wherein:
configuring the uplink data transmission comprises: determining a transport block size for the uplink data transmission based at least in part on the determined number of resource elements per physical resource block.

19. The method of claim 16, wherein:
the downlink control information comprises an explicit indication of the number of resource elements per physical resource block, and wherein number of resource elements per physical resource block is determined based at least in part on the explicit indication.

20. The method of claim 19, wherein:
the explicit indication of the number of resource elements per physical resource block is included in a device-specific control search space.

21. The method of claim 16, wherein:
determining the number of resource elements per physical resource block based at least in part on the downlink control information comprises: determining the number of resource elements based at least in part on a configuration of the downlink control information.

22. The method of claim 21, wherein:
determining the number of resource elements per physical resource block based at least in part on the configuration of the downlink control information comprises: using a selection algorithm known to the UE and a base station to determine the number of resource elements per physical resource block.

23. The method of claim 22, wherein:
the selection algorithm comprises at least one of an algorithm for determining the number of resource elements per physical resource block corresponding to a slot configuration of the downlink control information, an algorithm for determining the number of resource elements per physical resource block based at least in part on the reference signal overhead indicated by the downlink control information, and an algorithm for determining the number of resource elements per physical resource block based at least in part on the number of PDSCH symbols allocated by the downlink control information.

24. The method of claim 22, wherein:
the selection algorithm comprises an algorithm for determining the number of resource elements per physical resource block closest to a number of resources for data transmission that are available in the slot.

25. The method of claim 19, further comprising:
receiving, from a transmitting base station, an indication of whether aperiodic channel state information reference signals are to be taken into account when determining the number of resource elements per physical resource block.

26. The method of claim 19, further comprising:
receiving, from a transmitting base station, an indication of which reference signals are to be taken into account when determining the number of resource elements per physical resource block.

27. The method of claim 21, wherein:
the number of resource elements per physical resource block is determined based at least in part on the reference signal overhead indicated by the downlink control information and the number of PDSCH symbols allocated by the downlink control information.

28. An apparatus for wireless communication, comprising:
means for receiving, by a wireless device, downlink control information;
means for receiving a data transmission assigned by the downlink control information;
means for determining a number of resource elements per physical resource block based at least in part on the downlink control information, wherein the number of resource elements per physical resource block is determined based at least in part on a reference signal overhead indicated by the downlink control information or a number of physical downlink shared channel (PDSCH) symbols allocated by the downlink control information; and
means for processing the data transmission based at least in part on the determined number of resource elements per physical resource block.

29. The apparatus of claim 28, wherein:
processing the data transmission comprises: determining a transport block size for the data transmission based at least in part on the determined number of resource elements per physical resource block.

30. An apparatus for wireless communication, comprising:
means for receiving, by a wireless device, downlink control information;
means for determining a number of resource elements per physical resource block based at least in part on the downlink control information, wherein the number of resource elements per physical resource block is determined based at least in part on a reference signal overhead indicated by the downlink control information or a number of physical downlink shared channel (PDSCH) symbols allocated by the downlink control information; and
means for configuring an uplink data transmission based at least in part on the determined number of resource elements per physical resource block.

* * * * *